US010456856B2

(12) United States Patent
Sigler et al.

(10) Patent No.: US 10,456,856 B2
(45) Date of Patent: Oct. 29, 2019

(54) WELDING ELECTRODE CUTTING TOOL AND METHOD OF USING THE SAME

(71) Applicant: GM Global Technology Operations LLC, Detroit, MI (US)

(72) Inventors: David R. Sigler, Shelby Township, MI (US); Blair E. Carlson, Ann Arbor, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/418,768

(22) Filed: Jan. 29, 2017

(65) Prior Publication Data
US 2017/0225262 A1    Aug. 10, 2017

Related U.S. Application Data

(60) Provisional application No. 62/291,005, filed on Feb. 4, 2016.

(51) Int. Cl.
   *B23C 3/12*   (2006.01)
   *B23K 11/30*  (2006.01)
   *B23B 5/16*   (2006.01)

(52) U.S. Cl.
   CPC .......... *B23K 11/3063* (2013.01); *B23B 5/166* (2013.01); *Y10T 29/5107* (2015.01); *Y10T 409/304256* (2015.01)

(58) Field of Classification Search
   CPC ..... Y10T 409/304144; Y10T 409/3042; Y10T 409/304256; B23K 11/3063; B23B 5/166
   (Continued)

(56) References Cited

U.S. PATENT DOCUMENTS 3,820,437 A   6/1974  Dyer et al.
4,591,687 A   5/1986  Urech
(Continued)

FOREIGN PATENT DOCUMENTS

CN       104043898 A      9/2014
DE    102010025835 B3 *  10/2011
(Continued)

OTHER PUBLICATIONS

Machine Translation JP 2000-288744-A, which JP '744 was published Oct. 2000.*
(Continued)

*Primary Examiner* — Erica E Cadugan
(74) *Attorney, Agent, or Firm* — Reising Ethington P.C.

(57) ABSTRACT

A cutting tool that can simultaneously cut and restore asymmetric weld face geometries of two welding electrodes that are subject to different degradation mechanisms is disclosed along with a method of using such a cutting tool during resistance spot welding of workpiece stack-ups that include dissimilar metal workpieces. The cutting tool includes a first cutting socket and a second cutting socket. The first cutting socket is defined by one or more first shearing surfaces and the second cutting is defined by one or more second shearing surfaces. The first shearing surface(s) and the second shearing surface(s) are profiled to cut and restore a first weld face geometry and a second weld face geometry, respectively, that are different from each other upon receipt of electrode weld faces within the cutting sockets and rotation of the cutting tool.

18 Claims, 9 Drawing Sheets

(58) Field of Classification Search
USPC .................................................. 409/138–140
See application file for complete search history.

(56) References Cited

U.S. PATENT DOCUMENTS

| | | | |
|---|---|---|---|
| 5,304,769 A | | 4/1994 | Ikegami et al. |
| 6,322,296 B1 | | 11/2001 | Wetli et al. |
| 7,249,482 B2 | | 7/2007 | Chen |
| 8,833,215 B2 | | 9/2014 | Sigler et al. |
| 2013/0015164 A1 | * | 1/2013 | Sigler .................. B23K 11/115 |
| | | | 219/87 |
| 2017/0225263 A1 | * | 8/2017 | Sigler .................... B23K 11/20 |
| 2018/0236593 A1 | * | 8/2018 | Lanham ............. B23K 11/3063 |
| 2018/0272458 A1 | * | 9/2018 | Tezawa .................... B23B 5/16 |

FOREIGN PATENT DOCUMENTS

| | | | | |
|---|---|---|---|---|
| DE | 102015012743 A1 | * | 4/2017 | |
| EP | 0804986 A1 | * | 11/1997 | |
| FR | 1224775 A | | 6/1960 | |
| JP | 2000-288744 A | * | 10/2000 | |

OTHER PUBLICATIONS

Machine Translation DE 102010025835 B3, which DE '835 was published Oct. 2011.*
Machine Translation EP 0804986 A1, which EP '986 was published Nov. 1997.*
U.S. Appl. No. 15/418,771 entitled "Welding Electrode Culling Tool and Method of Using the Same," filed Jan. 29, 2017.

* cited by examiner

Cutting Tool in Which a Cutting Member Within a Body has One or More Cutting Flutes, Each Cutting Flute Comprising an Elongate Foot that is Integrally Formed with the Interior Surface of the Body to Fixedly Retain the Cutting Member Within the Body

*FIG. 19*

WELDING ELECTRODE CUTTING TOOL AND METHOD OF USING THE SAME

CROSS-REFERENCE TO RELATED APPLICATION(S)

This application claims the benefit of U.S. Provisional Application No. 62/291,005, which was filed on Feb. 4, 2016. The aforementioned provisional application is incorporated herein by reference in its entirety.

TECHNICAL FIELD

The technical field of this disclosure relates generally to a cutting tool for dressing welding electrodes that are used to resistance spot weld workpiece stack-ups that include dissimilar workpieces such as an aluminum workpiece and an adjacent steel workpiece.

INTRODUCTION

Resistance spot welding is a process used by a number of industries to join together two or more metal workpieces. The automotive industry, for example, often uses resistance spot welding to join together metal workpieces during the manufacture of structural frame members (e.g., body sides and cross members) and vehicle closure members (e.g., vehicle doors, hoods, trunk lids, and lift-gates), among others. A number of spot welds are often formed at various points around an edge of the metal workpieces or some other bonding region to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. The aforementioned desire to resistance spot weld dissimilar metal workpieces is not unique to the automotive industry; indeed, it extends to other industries that may utilize spot welding including the aviation, maritime, railway, and building construction industries.

Resistance spot welding, in general, relies on the flow of electrical current through overlapping metal workpieces to generate heat. To carry out such a welding process, a set of opposed welding electrodes is pressed in facial alignment against opposite sides of the workpiece stack-up, which typically includes two or three metal workpieces arranged in a lapped configuration. Electrical current is then passed through the metal workpieces from one welding electrode to the other. Resistance to the flow of this electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool that penetrates into the aluminum workpiece from the faying interface. This molten aluminum weld pool wets the adjacent faying surface of the steel workpiece and, upon cessation of the current flow, solidifies into a weld joint that weld bonds the two workpieces together.

Each of the welding electrodes used to conduct resistance spot welding includes a weld face disposed on an end of an electrode body. The weld face is the portion of the welding electrode that contacts and electrically communicates with the workpiece stack-up. Over the course of repeated resistance spot welding operations, the weld faces of the welding electrodes are susceptible to degradation due to the large quantity of heat generated at the weld faces during current flow and the high compressive force used to hold the weld faces against the workpiece stack-up. Such degradation may include plastic deformation of the weld face and/or contamination build-up that results from a reaction between the electrode and its respective contacting workpiece at elevated temperatures. In order to extend the life of the welding electrodes, especially in a manufacturing setting, the weld faces of the welding electrodes may be periodically restored to their original geometry. This restorative process should be quick, practical, and accurate so that it does not disrupt manufacturing operations by keeping the welding electrodes off-line for extended periods of time.

Resistance spot welding an aluminum workpiece to a steel workpiece is fraught with challenges. Apart from the need to periodically dress weld faces that undergo different degradation mechanisms, the disparate properties of the two workpieces and the presence of a mechanically tough, electrically insulating, and self-healing refractory oxide layer (or layers) on the aluminum workpiece have made it difficult to consistently achieve weld joints with adequate peel and cross-tension strengths. Given that previous spot welding efforts have not been particularly successful, mechanical fasteners including self-piercing rivets and flow-drill screws have predominantly been used to fasten aluminum and steel workpieces together. Mechanical fasteners, however, take longer to install and have high consumable costs compared to spot welding. They also add weight to the vehicle body structure—weight that is avoided when joining is accomplished by way of spot welding—that offsets some of the weight savings attained through the use of aluminum workpieces in the first place. Additionally, mechanical fasteners can introduce locations for galvanic corrosion with the aluminum workpiece since the fasteners are typically made of steel.

SUMMARY

One embodiment of a cutting tool capable of dressing asymmetric weld face geometries of first and second welding electrodes includes a body and a cutting member within the body. The body has a first end having a first opening and a second end having a second opening. The cutting member has one or more cutting flutes. Each of the one or more cutting flutes extends inwardly from an interior surface of the body and comprises a cutting blade that has axially spaced apart and opposed first and second shearing surfaces. The one or more cutting flutes thus establish a first cutting socket, which is defined by the first shearing surfaces(s) and accessible through the first opening of the body, and a second cutting socket, which is defined by the second shearing surface(s) and accessible through the second opening of the body. The first cutting socket is constructed to cut a first weld face geometry into a weld face of a first welding electrode and the second cutting socket is constructed to cut a second weld face geometry into a weld face of a second welding electrode when the weld faces of the first and second welding electrodes are received in the first and second cutting sockets, respectively, and the cutting tool is rotated. The first weld face geometry comprises a planar or domed base weld face surface and the second weld face geometry comprises a domed base weld face surface and a series of upstanding circular ridges that project outwardly from the domed base weld face surface.

The construction of the cutting tool is subject to some variability without losing its dressing capability. For example, each of the one or more cutting flutes may comprise an elongate foot that supports the cutting blade at the interior surface of the body. The elongate foot of each of the one or more cutting flutes may be friction fit within a retention channel defined by a depressed surface in the interior surface of the body to fixedly retain the cutting member within the body. Or, in another implementation, the elongate foot of each of the one or more cutting flutes may be integrally formed with the interior surface of the body to fixedly retain the cutting member within the body.

As another example of a specific construction of the cutting tool, the cutting member may comprise a first cutting flute having a first cutting blade, a second cutting flute having a second cutting blade, a third cutting flute having a third cutting blade, and a fourth cutting flute having a fourth cutting blade. The first, second, third, and fourth cutting blades are circumferentially spaced from each other such that each of the first, second, third, and fourth cutting blades is oriented transverse to each of its two circumferentially adjacent cutting blades. Additionally, each of the first, second, third, and fourth cutting blades includes axially spaced apart and opposed first and second shearing surfaces. The first shearing surfaces of the first, second, third, and fourth cutting blades define the first cutting socket and the second shearing surfaces of the first, second, third, and fourth cutting blades define the second cutting socket.

Still further, when the cutting member includes the first, second, third, and fourth cutting blades, each of the first shearing surface of the first cutting blade and the first shearing surface of the third cutting blade, which are aligned, has a lower end portion having an upwardly profiled leading edge and an upwardly profiled trailing edge that is offset below the leading edge by a positive relief angle. Similarly, each of the second shearing surface of the second cutting blade and the second shearing surface of the fourth cutting blade, which are aligned yet oriented transverse to the first shearing surface of the first cutting blade and the first shearing surface of the third cutting blade, has a lower end portion having an upwardly profiled leading edge and an upwardly profiled trailing edge that is offset below the leading edge by a positive relief angle and that further comprises a plurality of intruding grooves that extend from the leading edge at least part of the way to the trailing edge. The intruding grooves that extend across the lower end portion of the second shearing surface of the second cutting blade and the second shearing surface of the fourth cutting blade may be curved or straight.

The first shearing surface of the first and third cutting blades, and the second shearing surface of the second and fourth cutting blades, may have additional structure besides their respective lower end portions. For instance, the first shearing surface of each of the first and third cutting blades may also include an upper end portion that extends from its respective lower end portion and is convex in shape. The upper end portion of the first shearing surface of each of the first and third cutting blades has a leading edge and a trailing edge. Likewise, the second shearing surface of each of the second and fourth cutting blades may include an upper end portion that extends from its respective lower end portion and is convex in shape. The upper end portion of the second shearing surface of each of the second and fourth cutting blades has a leading edge and a trailing edge.

Specific examples of the first and second weld face geometries that can be dressed by the cutting tool may be further defined. The first weld face geometry, for example, may comprise a spherically domed base weld face surface that has a diameter between 3 mm and 16 mm and a radius of curvature between 8 mm and 400 mm. As for the second weld face geometry, it may comprise a spherically domed base weld face surface that has a diameter between 8 mm and 20 mm and a radius of curvature between 15 mm and 300 mm, and may further include anywhere from two to ten upstanding circular ridges that surround a weld face axis and increase in diameter from an innermost upstanding circular ridge that immediately surrounds the weld face axis to an outermost upstanding circular ridge furthest from the weld face axis. The upstanding circular ridges may be spaced apart on the domed base weld face surface by a distance of 50 μm to 1800 μm, and each of the upstanding circular ridges may have a ridge height that ranges from 20 μm to 500 μm.

Another embodiment of a cutting tool capable of dressing asymmetric weld face geometries of first and second welding electrodes includes a body and a cutting member within the body. The body extends longitudinally along a central axis between a first end and a second end. The cutting member establishes a first cutting socket accessible through the first opening at the first end of the body and further establishes a second cutting socket accessible through a second opening at the second end of the body. The cutting member comprises a cutting flute that includes a cutting blade having axially spaced apart and opposed first and second shearing surfaces that define, at least in part, the first and second cutting sockets, respectively. The first shearing surface comprises a lower end portion profiled to cut a first weld face geometry that comprises a planar or domed base weld face surface, and the second shearing surface comprises a lower end portion profiled to cut a second weld face geometry that comprises a domed base weld face surface and a series of upstanding circular ridges and project outwardly from the domed base weld face surface.

Specific examples of the first and second weld face geometries that can be dressed by the cutting tool may be further defined. The first weld face geometry, for example, may comprises a spherically domed base weld face surface that has a diameter between 3 mm and 16 mm and a radius of curvature between 8 mm and 400 mm. As for the second weld face geometry, it may comprise a spherically domed base weld face surface that has a diameter between 8 mm and 20 mm and a radius of curvature between 15 mm and 300 mm, and may further include anywhere from two to ten upstanding circular ridges that surround a weld face axis and increase in diameter from an innermost upstanding circular ridge that immediately surrounds the weld face axis to an outermost upstanding circular ridge furthest from the weld face axis. The upstanding circular ridges may be spaced apart on the domed base weld face surface by a distance of 50 μm to 1800 μm, and each of the upstanding circular ridges may have a ridge height that ranges from 20 μm to 500 μm.

The construction of the cutting tool is subject to some variability without losing its dressing capability. For instance, the cutting member may comprise a first cutting flute having a first cutting blade, a second cutting flute having a second cutting blade, a third cutting flute having a third cutting blade, and a fourth cutting flute having a fourth cutting blade. The first, second, third, and fourth cutting blades are circumferentially spaced from each other such that each of the first, second, third, and fourth cutting blades is oriented transverse to each of its two circumferentially adjacent cutting blades. Additionally, each of the first, second, third, and fourth cutting blades includes axially spaced apart and opposed first and second shearing surfaces. The first shearing surfaces of the first, second, third, and fourth cutting blades define the first cutting socket and the second shearing surfaces of the first, second, third, and fourth cutting blades define the second cutting socket.

Still further, when the cutting member includes the first, second, third, and fourth cutting blades, each of the first shearing surface of the first cutting blade and the first shearing surface of the third cutting blade, which are aligned, has a lower end portion having an upwardly profiled leading edge and an upwardly profiled trailing edge that is offset below the leading edge by a positive relief angle. Similarly, each of the second shearing surface of the second cutting blade and the second shearing surface of the fourth cutting blade, which are aligned yet oriented transverse to the first shearing surface of the first cutting blade and the first shearing surface of the third cutting blade, has a lower end portion having an upwardly profiled leading edge and an upwardly profiled trailing edge that is offset below the leading edge by a positive relief angle and that further comprises a plurality of intruding grooves that extend from the leading edge at least part of the way to the trailing edge.

As another example of a specific construction of the cutting tool, the cutting member may be supported within the body in several different ways. In one particular implementation, the body and the cutting member are integrally formed. In another implementation, the body and the cutting member are discrete individual pieces that are secured together. The securement between the body and the cutting member may be achieved in any of a wide variety of acceptable manners. In one specific embodiment, for example, the cutting flute may comprise an elongate foot that supports the cutting blade at the interior surface of the body. The elongate foot may be friction fit within a retention channel defined by a depressed surface in the interior surface of the body to fixedly retain the cutting member within the body.

A method of dressing welding electrodes having asymmetric weld face geometries includes several steps according to one embodiment of the disclosure. In particular, a cutting tool is provided that includes a body and a cutting member within the body. The cutting member comprises one or more cutting flutes that establish a first cutting socket and a second cutting socket. The first cutting socket is accessible through a first opening at a first end of the body and the second cutting socket is accessible through a second opening at a second end of the body. A first weld face of a first welding electrode is received in the first cutting socket and a second weld face of a second welding electrode is received in the second cutting socket. Once the first and second weld faces are received in the first and second cutting sockets, respectively, the cutting tool is rotated to cut and restore a first weld face geometry in the first weld face and a second weld face geometry in the second weld face. The first weld face geometry comprises a planar or domed base weld face surface, and the second weld face geometry comprises a domed base weld face surface and a series of upstanding circular ridges that project outwardly from the domed base weld face surface.

The method of dressing welding electrodes having asymmetric weld face geometries may be practiced with certain preferences. For instance, the cutting tool may be rotated between one and ten full rotations about axes of the first and second weld faces such that a depth of material ranging from 10 μm and 500 μm is removed from each of the first weld face and the second weld face during restoration of the first weld face geometry and the second weld face geometry. Additionally, a set of ten to one hundred weld joints between overlapping and adjacent steel and aluminum workpieces may be formed prior to receiving the first weld face in the first cutting socket of the cutting tool and the second weld face in the second cutting socket of the cutting tool. Many other variations of the resistance spot welding method may of course be practiced.

BRIEF DESCRIPTION OF THE DRAWINGS

FIG. 19 schematically depicts a further embodiment.

DETAILED DESCRIPTION

A cutting tool is disclosed that can simultaneously cut and restore asymmetric weld face geometries of two welding electrodes that are subject to different degradation mechanisms. The cutting tool may be used as part of a method for resistance spot welding a workpiece stack-up that includes adjacent and overlapping steel and aluminum workpieces. In particular, a first welding electrode with a first weld face and a second welding electrode with a second weld face may be employed to pass an electrical current through the workpiece stack-up at a weld site. The geometry of the first weld face and the geometry of the second weld face are asymmetric because of the need to compensate for the different physical properties of the adjacent steel and aluminum workpieces. Over time, the first and second weld faces become degraded to such an extent that spot welding operations are adversely affected. To address this issue, the cutting tool can be used to periodically redress both the first and second weld faces of the first and second welding electrodes, respectively. Redressing the weld faces involves receiving the first weld face in a first cutting socket and receiving the second weld face in a second cutting socket, and then rotating the cutting tool about the axes of the first and second weld faces to cut the weld faces and restore their geometries.

A cutting tool and a method of using the cutting tool in the context of resistance spot welding a workpiece stack-up that includes adjacent and overlapping steel and aluminum workpieces is described with reference to FIGS. 1-18. The cutting tool is constructed to simultaneously dress the weld faces of both welding electrodes even though the geometries of the weld faces are designed asymmetrically based on the significant differences in physical properties between the steel and aluminum workpieces (e.g., melting point, thermal conductivity, electrical conductivity, strength at elevated temperatures, etc.). In this way, the weld faces of both welding electrodes can be periodically dressed with the same cutting tool in a single operation to restore their original unique geometries, as opposed to being separately dressed by their own dedicated cutting tools. Dressing the weld faces with the same cutting tool is more efficient, and can be performed whenever desired to counteract the weld face degradation mechanisms that, if allowed to progress without intervention, would quickly compromise the welding electrodes and weld quality, and would eventually render them unfit for continued use in spot welding operations. The cutting tool may be used to dress the weld faces as much as possible until the weld faces can no longer support dressing due to the cumulative material loss attributed to the dressing operations.

Figure 2:
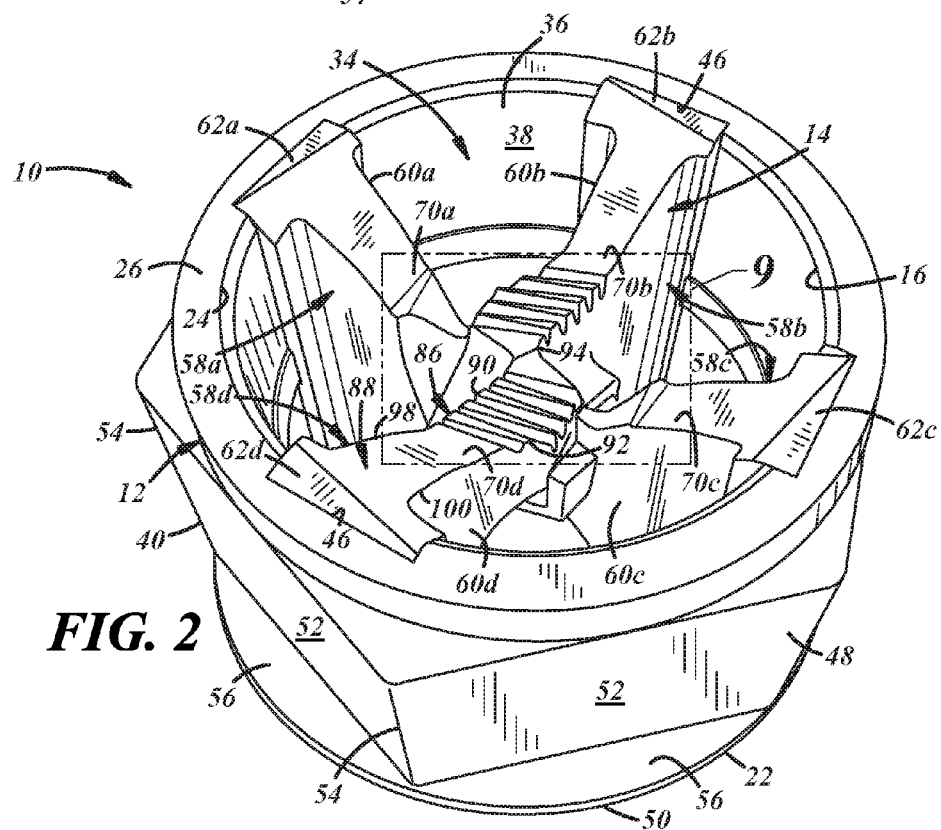
FIG. 2 is a perspective view of the cutting tool depicted in FIG. 1, and, in particular, the second cutting socket of the cutting tool.
Figure 3:
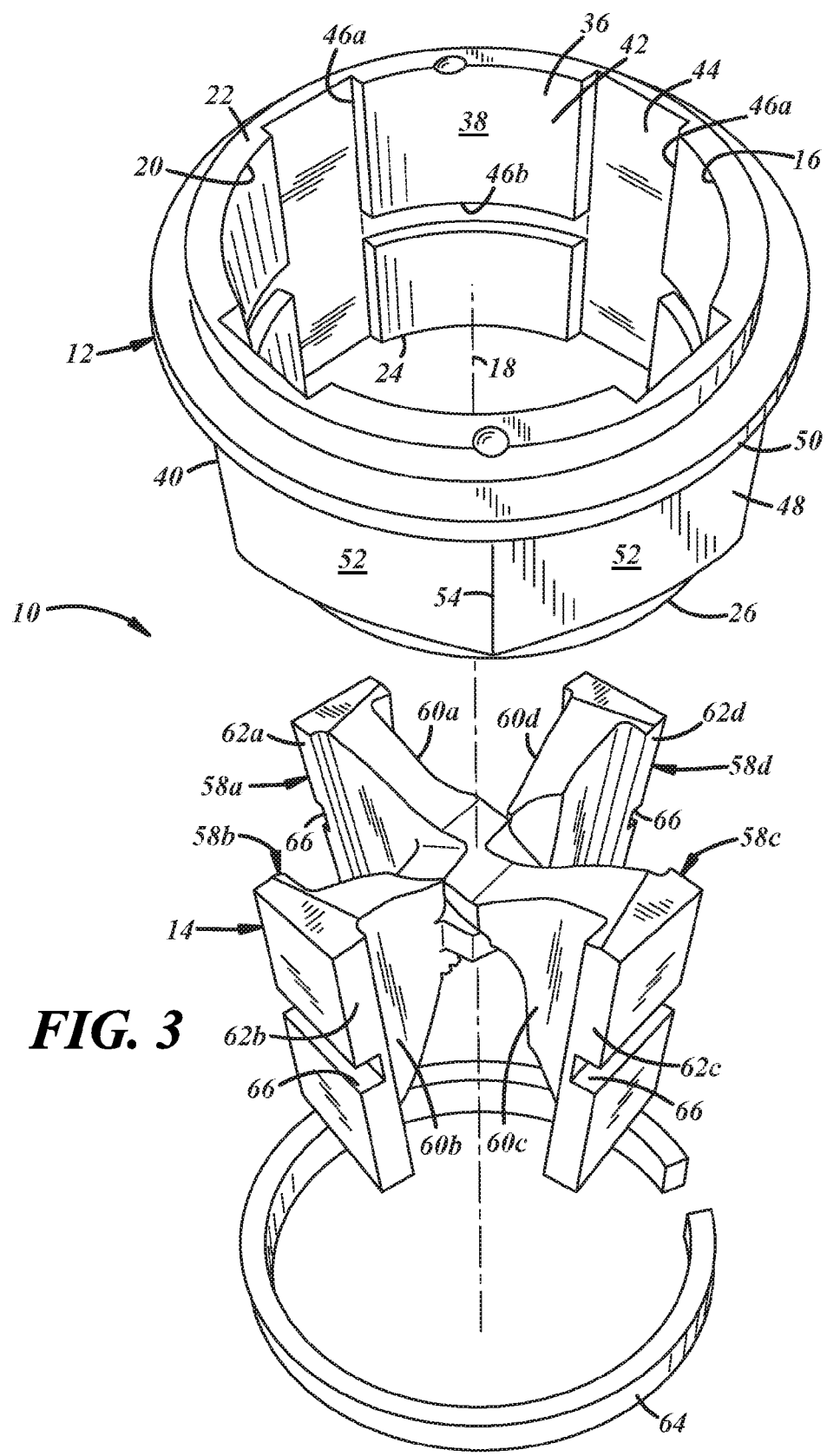
FIG. 3 is an exploded view of the cutting tool depicted in FIGS. 1-2 showing a body and a cutting member separated from one another according to one embodiment of the disclosure.
Figure 4:
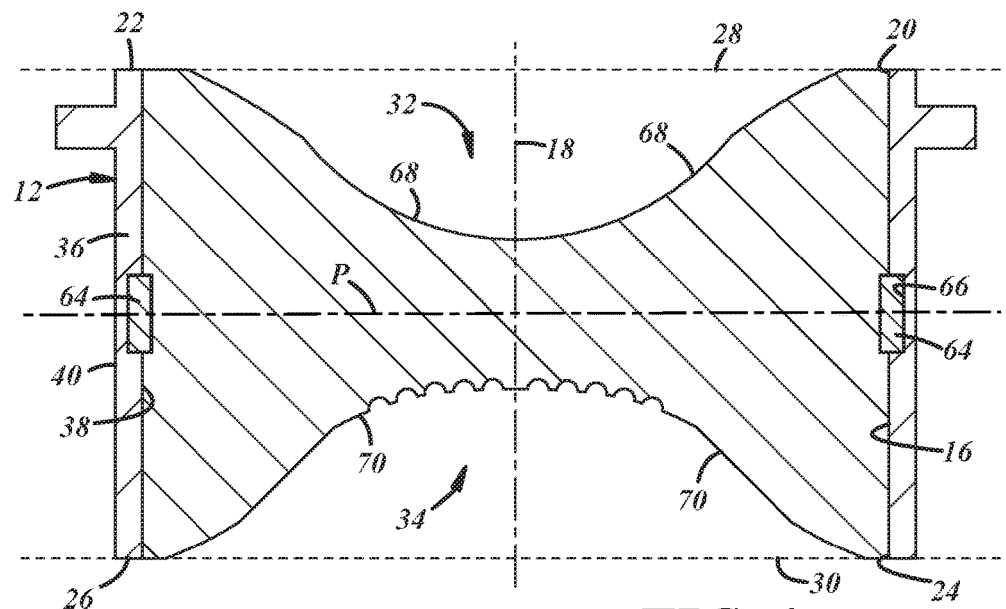
FIG. 4 is a cross-sectional view of the cutting tool depicted in FIGS. 1-2 according to one embodiment of the disclosure.

A preferred embodiment of the cutting tool is shown in FIGS. 1-9 and is identified by reference numeral 10. The cutting tool 10 comprises a body 12 and a cutting member 14. The body 12 defines a through hole 16 that extends longitudinally along a central axis 18 between a first opening 20 at a first end 22 of the body 12 and a second opening 24 at a second end 26 of the body 12. Each of the openings 20, 24 lies perpendicular to the central axis 18 of the through hole 16 such that a plane 28 of the first opening 20 and a plane 30 of the second opening 22 are parallel to one another and are intersected by the central axis 18 at 90° angles, as shown in FIG. 4. The cutting member 14 is fixedly retained by the body 12 within the through hole 16. The cutting member 14 establishes a first cutting socket 32 and a second cutting socket 34. The first cutting socket 32 is accessible through the first opening 20 of the body 12 and the second cutting socket 34 is accessible through the second opening 24 of the body 12.

The body 12 and the cutting member 14 are constructed of a hard material that is capable of withstanding welding electrode dressing operations. For example, each of the body 12 and the cutting member 14 may be formed of a tool steel such as S7 or M2 tool steel. Furthermore, the cutting member 14 can be fixedly retained by the body 12 in a variety of ways that renders those two portions of the tool 10 unable to move relative to each other when the tool 10 is operational. In one embodiment, the body 12 and the cutting member 14 may be discrete individual pieces that are assembled and secured together to fabricate the cutting tool 10. This can be achieved in a number of ways including mechanical locking, fusion welding, brazing, soldering, adhesive bonding, or a combination of any of these techniques. In another embodiment (schematically depicted in FIG. 19, for example), the body 12 and the cutting member 14 are integrally formed, e.g., machined from a single solid piece of tool steel, so as to constitute a single integral piece in the sense that the body 12 and the cutting member 14 did not previously exist as discrete items.

The body 12 includes an annular wall 36 that extends between the axially spaced apart first and second ends 22, 26 of the body 12. The annular wall 36 has an interior surface 38 and an exterior surface 40. The interior surface 38 of the annular wall 36 defines the through hole 16 that passes through the body 12 including the first and second openings 20, 24. The interior surface 38 has a base surface 42 and one or more depressed surfaces 44 that are impressed into the annular wall 36 to delineate one or more retention channels 46. The one or more retention channels 46 serve to retain the cutting member 14 within the through hole 16 in the event that the body 12 and the cutting member 14 are not integrally formed. And, as shown here in FIG. 3, the retention channels 46 may include a plurality of axial retention channels 46a that extend axially from the first end 22 of the body 12 to the second end 26 and are circumferentially spaced around the interior surface 38, and may further include a circumferential retention channel 46b that extends circumferentially around the interior surface 38 and intersects each of the axial retention channels 46a.

The exterior surface 40 of the annular wall 36 includes an integral retaining nut 48 and an integral radial flange 50. The integral retaining nut 48 protrudes from a central part of the annular wall 36 between the first and second ends 22, 26 of the body 12 and has a plurality of planar surfaces 52 that intersect at circumferentially spaced axial edges 54 (FIG. 2). In a preferred embodiment, the integral retaining nut 48 includes six planar surfaces 52 of equal size arranged hexagonally around the exterior surface 40 of the annular wall 36. The integral radial flange 50 adjoins and bears on an axial end of the integral retaining nut 48 proximate either the first or second end 22, 26 of the body 12. Here, in FIGS. 1-9, the integral radial flange 50 is located proximate the first end 22, although it could just as easily be located proximate the second end 26, if desired. The integral radial flange 50 extends radially outwardly beyond the planar surfaces 52 of the integral retaining nut 48 to provide a semicircular seating surface 56 that projects transversely from each of the planar surfaces 52 as shown best in FIGS. 2 and 6. The combination of the integral retaining nut 48 and the integral radial flange 50 enables the cutting tool 10 to be received and clutched within a rotatable cutting tool holder such as, for example, a chuck.

The cutting member 14 includes one or more cutting flutes 58 that establish the first and second cutting sockets 32, 34. The one or more cutting flutes 58 are constructed to dress weld faces that are received in the first and second cutting sockets 32, 34 and to restore asymmetric geometries to those weld faces through a shearing action that results when the cutting tool 10 is rotated about the central axis 18 of the through hole 16. Each of the cutting flutes 58 includes a blade 60 that is supported at the interior surface 38 of the annular wall 36 by an elongate foot 62 that spans the entire axial dimension of the annular wall 36. Anywhere from one to four cutting flutes 58 may be present as part of the cutting member 14. In a preferred embodiment, as shown here in FIGS. 1-6, the one or more cutting flutes 58 include a first cutting flute 58a, a second cutting flute 58b, a third cutting flute 58c, and a fourth cutting flute 58d. The blades 60 and elongate feet 62 of the four cutting flutes 58a, 58b, 58c, 58d are consequently identified in FIGS. 1-6 by reference numerals 60a, 60b, 60c, 60d and 62a, 62b, 62c, 62d, respectively.

In the embodiment shown, each of the elongate feet 62a, 62b, 62c, 62d is axially inserted into one of the axial retention channels 46a of the interior surface 38 of the annular wall 36 and is held tightly in place by friction due to the close complimentary shape of the retention channels 46a and the elongate feet 62, as illustrated best in FIG. 3. Moreover, to further secure the cutting flutes 58a, 58b, 58c, 58d in place, and to especially prevent unwanted axial movement of the cutting flutes 58a, 58b, 58c, 58d within the through hole 16, a radial spring washer 64 that is radially outwardly biased into the circumferential retention channel 46b may be received in and extend through a transverse groove 66 defined in a back end of each of the elongate feet 62a, 62b, 62c, 62d. Other mechanisms for fixedly retaining the cutting flutes 58a, 58b, 58c, 58d to the interior surface 38 of the annular wall 36 within the through hole 16 may be employed in addition to or in lieu of the axially insertable elongate feet 62a, 62b, 62c, 62d and the radial spring washer 64. To be sure, in another embodiment, and as previously indicated, the elongate feet 62a, 62b, 62c, 62d of the cutting flutes 58a, 58b, 58c, 58d may be integrally formed with the interior surface 38 of the annular wall 36 such that the body 12 and the cutting member 14 constitute a single integral piece.

The blades 60a, 60b, 60c, 60d of the cutting flutes 58a, 58b, 58c, 58d protrude inwardly from the interior surface 38 of the annular wall 36 and interconnect centrally within the through hole 16. The blades 60a, 60b, 60c, 60d are circumferentially spaced from each other at regular intervals about the central axis 18 such that each blade 60 is oriented transverse to each of its two circumferentially adjacent blades 60. Each of the blades 60a, 60b, 60c, 60d includes axially spaced apart and opposed first and second shearing surfaces 68, 70. Specifically, in this embodiment, the blade 60a of the first cutting flute 58a includes a first shearing surface 68a proximate the first end 22 of the body 12 and a second shearing surface 70a proximate the second end 26 of the body 12. The blades 60b, 60c, 60d of the other cutting flutes 58b, 58c, 58d include similarly disposed first and second shearing surfaces 68b, 70b, 68c, 70c, 68d, 70d relative to the first and second ends 22, 26 of the body 12. Accordingly, in this embodiment, the first and second cutting sockets 32, 34 established by the cutting flutes 58 are defined collectively by the first shearing surfaces 68a, 68b, 68c, 68d and the second shearing surfaces 70a, 70b, 70c, 70d, respectively.

The first shearing surfaces 68a, 68b, 68c, 68d are profiled to cut and restore an electrode weld face of a first geometry and the second shearing surfaces 70a, 70b, 70c, 70d are profiled to cut and restore an electrode weld face of a second geometry that is different than the first geometry. The different profiles of the first shearing surfaces 68a, 68b, 68c, 68d and the second shearing surfaces 70a, 70b, 70c, 70d permit the cutting tool 10 to restore the first weld face geometry to a welding electrode received in the first cutting socket 32 and, simultaneously, to restore the second weld face geometry to another welding electrode received in the second cutting socket 34 while the tool 10 is being rotated about the central axis 18 of the through hole 16. In this way, the cutting tool 10 is able to dress two welding electrodes with asymmetric weld face geometries, which is a useful dressing practice when resistance spot welding is conducted with disparate welding electrodes such as, for example, when the workpiece stack-up being welded includes an aluminum workpiece and an adjacent steel workpiece.

The first and second weld face geometries that are cut by the first shearing surface(s) 68 and the second shearing surface(s) 70, respectively, are designed to resistance spot weld a workpiece stack-up that includes adjacent and overlapping steel and aluminum workpieces. The design of the weld face geometries is based in large part on the materially different physical properties of the steel workpiece and the aluminum workpiece being spot welded together. In particular, the first weld face geometry, which is deployed on the steel-side welding electrode, is designed to concentrate current within the steel workpiece (relative to the aluminum workpiece) and to also cause some deformation of the steel workpiece during electrical current flow. This takes advantage of the low conductivity—both thermally and electrically—of the steel workpiece as well as its elevated melting point relative to the aluminum workpiece. In a somewhat different fashion, the second weld face geometry, which is deployed on the aluminum-side electrode, is designed to break down the refractory oxide layer(s) on the aluminum workpiece and to contain the molten aluminum weld pool that grows within the aluminum workpiece. Both the size and the shape of the second weld face geometry have an effect on containing the molten aluminum weld pool as it grows.

Figure 1:
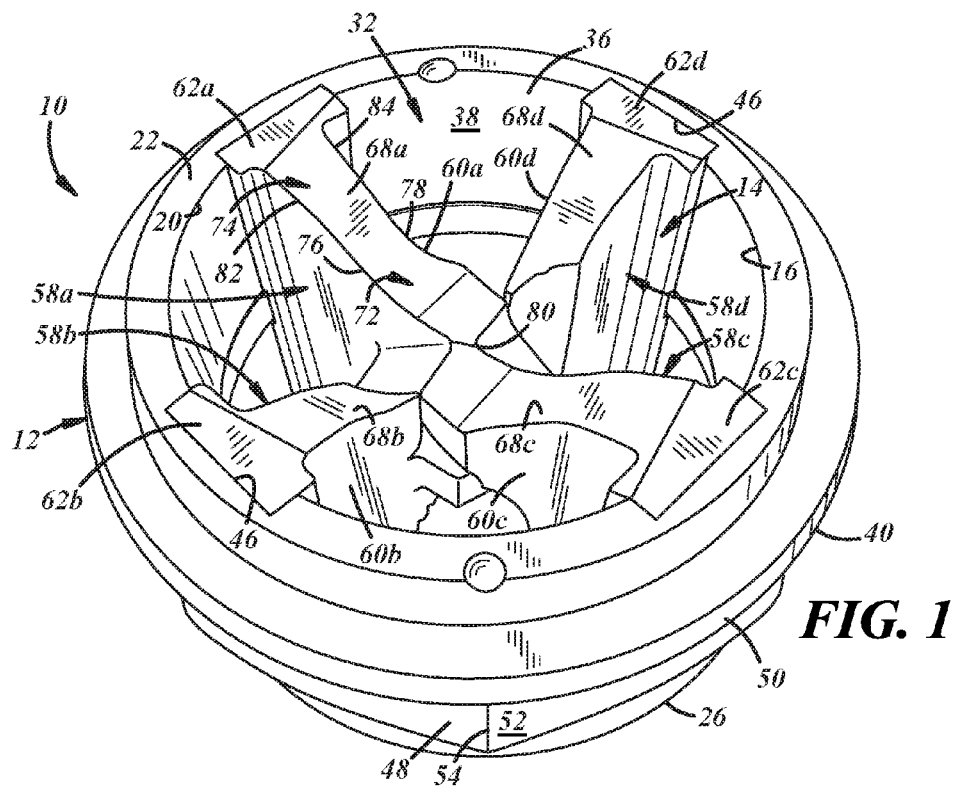
FIG. 1 is a perspective view of a cutting tool according to one embodiment of the present disclosure, and, in particular, the first cutting socket of the cutting tool.
Figure 5:
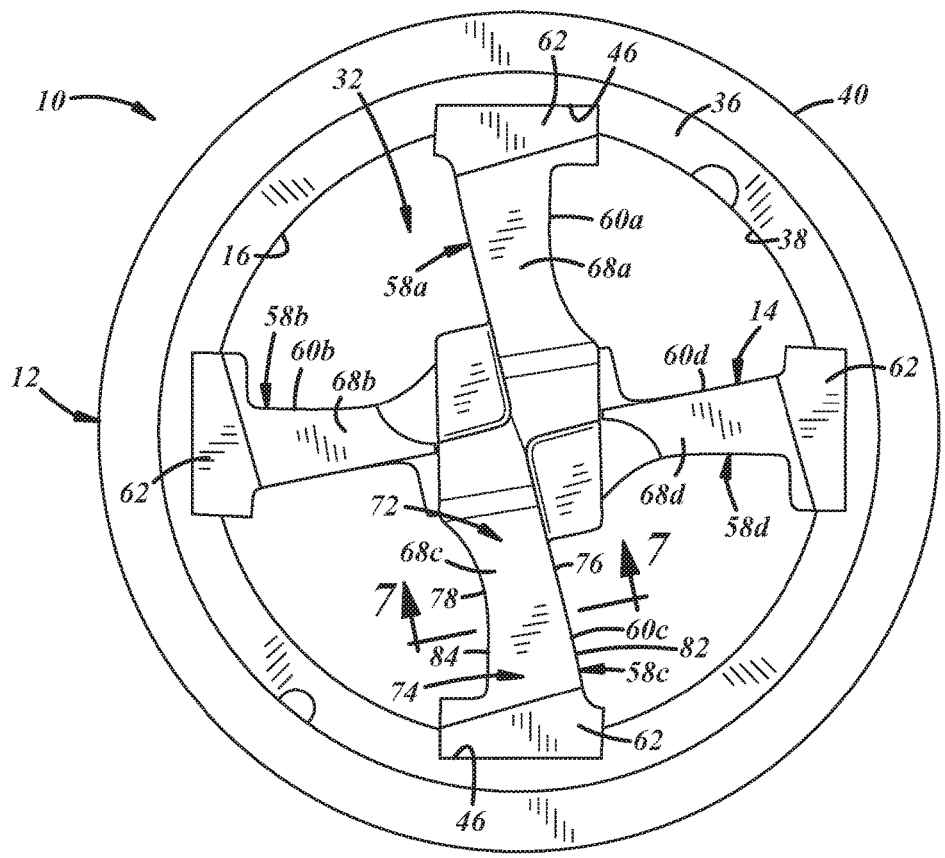
FIG. 5 is a plan view of the first cutting socket of the cutting tool depicted in FIGS. 1-2 according to one embodiment of the disclosure.
Figure 7:
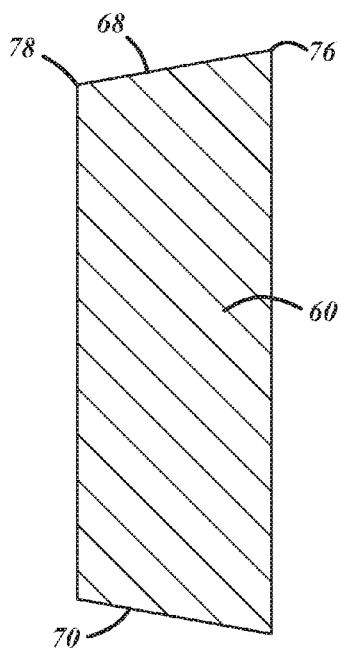
FIG. 7 is a cross-sectional view of a blade portion of one of the cutting flutes taken along section lines 7-7 in FIG. 5.

Referring now to FIGS. 1, 5, and 7, at least one of the first shearing surfaces 68a, 68b, 68c, 68d includes a lower or proximal end portion 72 and an upper or distal end portion 74 relative to an imaginary plane P oriented perpendicular to the central axis 18 and bisecting the cutting member 14. The lower or proximal end portion 72 is proximal to plane P and the upper or distal end portion 74 is distal to plane P. The lower end portion 72 extends at least to the central axis 18 of the through hole 16 and has a leading edge 76 and a trailing edge 78. The leading edge 76 is upwardly profiled from a distal tip 80 and is contoured to cut at least the first weld face geometry and any surrounding transition nose into a welding electrode. Following restoration, the weld face with the first geometry has a specified diameter and, additionally, a specified planar or domed shape. The trailing edge 78 of the lower end portion 72 is upwardly profiled like the leading edge 76 but is offset below the leading edge 76 such that the shearing surface 68 within the lower end portion 72 is inclined from the leading edge 76 to the trailing edge 78 at a positive relief angle that ranges from 3° to 8°. The positive relief angle is illustrated generally in FIG. 7.

The upper end portion 74 of the first shearing surface 68 is convex in shape and extends from the lower end portion 72 to the elongate foot 62 of the cutting flute 58. The upper end portion 74 has a leading edge 82 and a trailing edge 84. These two edges 82, 84 may be offset by a positive relief angle like in the lower end portion 72, but they do not necessarily have to since the upper end portion 74 is not necessarily involved in cutting the first weld face geometry. Rather, the upper end portion 74 functions to center and guide the welding electrode down towards the lower end portion 72 during rotation of the cutting tool 10 about the axis 18 of the through hole 16. Indeed, when a welding electrode is received in the first cutting socket 32 and the cutting tool 10 is being rotated to restore the first weld face geometry, the upper end portion 74 of the shearing surface 68 typically does not make contact with, and therefore does not cut, the neighboring regions of the welding electrode that are outside of the weld face and the transition nose.

Here, in the embodiment of FIGS. 1, 5, and 7, two of the aligned first shearing surfaces 68a, 68c include the lower end portion 72 just described, while the other two aligned first shearing surfaces 68b, 68d include a variation of the lower end portion 72 in which the only significant difference is that the distal tip 80 does not extend all the way to the axis 18 of the through hole 16. Each of the four shearing surfaces 68a, 68b, 68c, 68d also includes the upper end portion 74 described above for guiding and centering the welding electrode. All four of the first shearing surfaces 68a, 68b, 68c, 68d are thus profiled to participate in cutting a weld face to restore the first geometry while also helping to align and guide the weld face of the welding electrode into the proper position within the first cutting socket 32. The four shearing surfaces 68a, 68b, 68c, 68d are employed together in this embodiment to make it easier and less time consuming to restore the first geometry.

Figure 10:
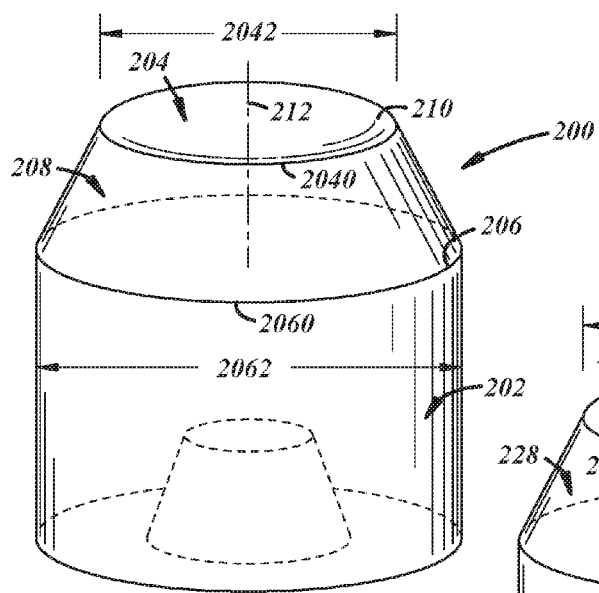
FIG. 10 is a general perspective view of a welding electrode that includes a first weld face geometry according to one embodiment of the disclosure.

A welding electrode 200 (also referred to as the "first welding electrode 200") that includes the first weld face geometry and is dressable within the first cutting socket 32 by the first shearing surface(s) 68 of the one or more cutting flutes 58 is shown in FIG. 10. The first welding electrode 200 includes an electrode body 202 and a weld face 204. The electrode body 202 is preferably cylindrical in shape and includes a front end 206 having a circumference 2060. A diameter 2062 of the body 202 at its front end circumference 2060 preferably lies within the range of 12 mm to 22 mm or, more narrowly, within the range of 16 mm to 20 mm. The weld face 204 is disposed on the front end 206 of the body 202 and has a circumference 2040 that is coincident with the circumference 2060 of the front end 206 of the body 202 (a "full face electrode") or is upwardly displaced from the circumference 2060 of the front end 206, to a distance between 2 mm and 10 mm, by a transition nose 208 of frustoconical or truncated spherical shape. If the transition nose 208 is frustoconical, the angle of truncation is preferably between 15° and 40° from a horizontal plane of the weld face circumference 2040. If the transition nose 208 is spherical, the radius of curvature of the transition nose 208 preferably ranges between 6 mm and 20 mm or, more narrowly, between 8 mm and 12 mm.

The weld face 204 preferably has a diameter 2042 measured at its circumference 2040 that lies within the range of 3 mm to 16 mm or, more narrowly, within the range of 4 mm to 8 mm. In terms of its shape, the weld face 204 includes a base weld face surface 210 that may be planar or domed. If domed, the base weld face surface 210 ascends upwardly and inwardly from the circumference 2040 of the weld face 204 to attain an upwardly curved convex shape. For example, in one particular embodiment, the base weld face surface 210 may be spherically domed in that it has a spherical profile with a radius of curvature that preferably lies within the range of 8 mm to 400 mm or, more narrowly, within the range of 25 mm to 100 mm. The geometry of the weld face 204—whether planar or domed in shape with its prescribed diameter 2042—may be cut and restored by receiving the degraded weld face 204 in the first cutting socket 32 of the cutting tool 10 and then rotating the tool 10 about an axis 212 of the weld face 204. In doing so, the first shearing surface(s) 68 of the one or more cutting flutes 58 shear off weld face material to expose fresh weld face material and to restore the first weld face geometry.

The first welding electrode 200 may be constructed from any electrically and thermally conductive material suitable for spot welding applications that may experience degradation during welding. For example, the first welding electrode 200 may be constructed from a copper alloy having an electrical conductivity of at least 80% IACS, or more preferably at least 90% IACS, and a thermal conductivity of at least 300 W/mK, or more preferably at least 350 W/mK. One specific example of a copper alloy that may be used for the first welding electrode 200 is a copper-zirconium alloy (CuZr) that contains about 0.10 wt % to about 0.20 wt % zirconium and the balance copper. Copper alloys that meet this constituent composition and are designated C15000 are preferred. Other copper alloy compositions, as well as other metal compositions not explicitly recited here, that possess suitable mechanical properties as well as electrical and thermal conductivity properties may also be employed, including, for example, a C18200 copper-chromium (CuCr) alloy, a C18150 copper-chromium-zirconium (CuCrZr) alloy, or a refractory-based metal composite such as a tungsten-copper metal composite.

Figure 8:
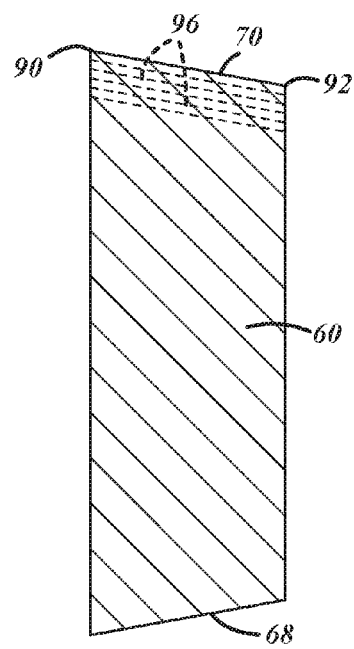
FIG. 8 is a cross-sectional view of a blade portion of one of the cutting flutes taken along section lines 8-8 in FIG. 6.

Referring now to FIGS. 2, 6, 8, and 9, at least one of the second shearing surfaces 70 includes a lower or proximal end portion 86 and an upper or distal end portion 88 relative to the imaginary plane P, much like the first shearing surface(s) 68. The lower or proximal end portion 86 is proximal to plane P and the upper or distal end portion 88 is distal to plane P. The lower end portion 86 extends at least to the central axis 18 of the through hole 16 and has a leading edge 90 and a trailing edge 92. The leading edge 90 is upwardly profiled from a distal tip 94 and is contoured to cut at least the second weld face geometry and any surrounding transition nose into a welding electrode. Following restoration, the weld face with the second geometry has a specified diameter and, additionally, a specified domed shape that includes a plurality of upstanding ringed ridges. The trailing edge 92 of the lower end portion 86 is upwardly profiled like the leading edge 90 but is offset below the leading edge 90 such that the shearing surface 70 within the lower end portion 86 is inclined from the leading edge 90 to the trailing edge 92 at a positive relief angle that ranges from 3° to 8°. The positive relief angle is illustrated in FIG. 8.

Figure 9:
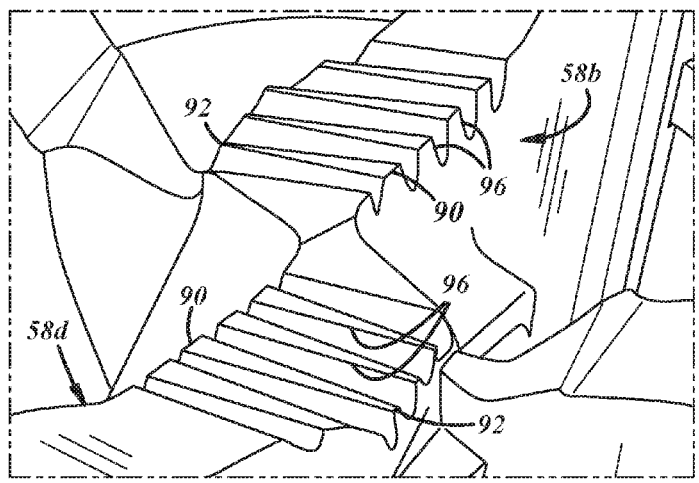
FIG. 9 is a partial magnified view of the second shearing surfaces of the cutting member shown in FIG. 2 in which two of those surfaces define a plurality of intruding grooves.

As shown best in FIG. 9, the second shearing surface 70 within the lower end portion 86 defines a plurality of intruding grooves 96 that extend from the leading edge 90 at least part of the way to the trailing edge 92 so that, during rotation of the cutting tool 10, upstanding ridges are cut into the weld face as part of the second weld face geometry. The intruding grooves 96, which may be straight or curved across the second shearing surface 70, preferably include between two and ten grooves that extend all the way across the shearing surface 70 from the leading edge 90 to the trailing edge 92. Each of the intruding grooves 96 has a height (measured as the maximum intruding distance from the shearing surface 70 at the leading edge 90) that ranges from 20 μm to 500 μm or, more narrowly, from 50 μm to 300 μm. Additionally, the intruding grooves 96 are spaced apart along the shearing surface 70 (measured as the distance between the midpoints of adjacent grooves 96 along the shearing surface 70 at the leading edge 90) that ranges from 50 μm to 1800 μm or, more narrowly, from 80 μm to 1500 μm. In a preferred embodiment, the bottom of each of the intruding grooves 96 has a constant radius of curvature to create a blunt or rounded shape in cross-section, although other alternative cross-sectional shapes are certainly possible including truncated semicircular and triangular.

Figure 6:
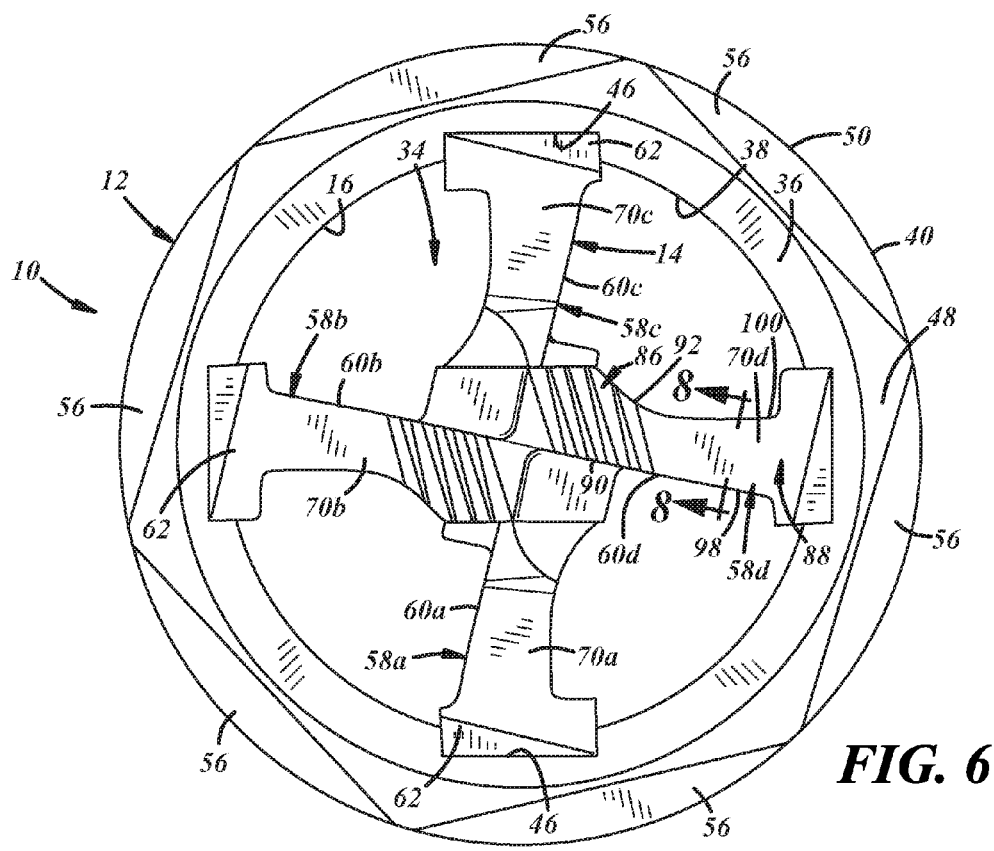
FIG. 6 is a plan view of the second cutting socket of the cutting tool depicted in FIGS. 1-2 according to one embodiment of the disclosure.

The intruding grooves 96 may extend from the leading edge 90 across the shearing surface 70 at a positive relief angle that is the same or different from the relief angle of the second shearing surface 70. In particular, the positive relief angle of the intruding grooves 96 from the leading edge 90 towards the trailing edge 92 may range from 1.5° to 20° or, more narrowly, from 5° to 15°. If the intruding grooves 96 extend straight across the second shearing surface 70, as shown in FIGS. 2 and 6, the relief angle of the grooves 96 is preferably greater than 8° to allow enough clearance between the interior groove walls and the upstanding ridges being cut and restored during rotation of the cutting tool 10. If, however, the intruding grooves 96 are curved across the second shearing surface 70 to match the curvature of the ridges being cut and restored, the positive relief angle can be the same or even less (e.g., down to 1.5°) than the relief angle of the second shearing surface 70 since the curvature of the grooves 96 naturally limits interference between the interior groove walls and the ridges being cut and restored.

The upper end portion 88 of the second shearing surface 70 is convex in shape and extends from the lower end portion 86 to the elongate foot 62 of the cutting flute 58. The upper end portion 88 has a leading edge 98 and a trailing edge 100. These two edges 98, 100 may be offset by a positive relief angle like in the lower end portion 86, but they do not necessarily have to since the upper end portion 88 is not necessarily involved in cutting the second weld face geometry. Rather, like before, the upper end portion 88 functions to center and guide the welding electrode down towards the lower end portion 86 during rotation of the cutting tool 10 about the central axis 18 of the through hole 16. Indeed, when a welding electrode is received in the second cutting socket 34 and the cutting tool 10 is being rotated to restore the second weld face geometry, the upper end portion 88 of the shearing surface 70 typically does not make contact with, and therefore does not cut, the neighboring regions of the welding electrode that are outside of the weld face and the transition nose.

In the embodiment of FIGS. 2, 6, 8, and 9, two of the aligned second shearing surfaces 70b, 70d include the lower end portion 86 just described, while the other two aligned second shearing surfaces 70a, 70c include a variation of the lower end portion 86 in which intruding grooves 96 are not present and the distal tip 94 does not extend all the way to the central axis 18 of the through hole 16. Each of the second shearing surfaces 70a, 70b, 70c, 70d also includes the upper end portion 88 as described above for guiding and centering the electrode. All four of the second shearing surfaces 70a, 70b, 70c, 70d are thus profiled to help align and guide the weld face of the welding electrode into the proper position within the second cutting socket 34 and to further cut and restore the transition nose region of the electrode. But only the two second shearing surfaces 70b, 70d that include the intruding grooves 96 actually participate in cutting a weld face to restore ringed ridges are part of the second weld face geometry. Moreover, as shown, the second shearing surfaces 70b, 70d that have distal tips 94 extending to the central axis 18 of the through hole 16 are not present on the same blades 60 as the first shearing surfaces 68a, 68c that similarly have distal tips 80 extending to the central axis 18 of the through hole 16. The two sets of first and second shearing surfaces 68a, 68c, 70b, 70d are, instead, oriented transverse to one another on the cutting member 14.

Figure 11:
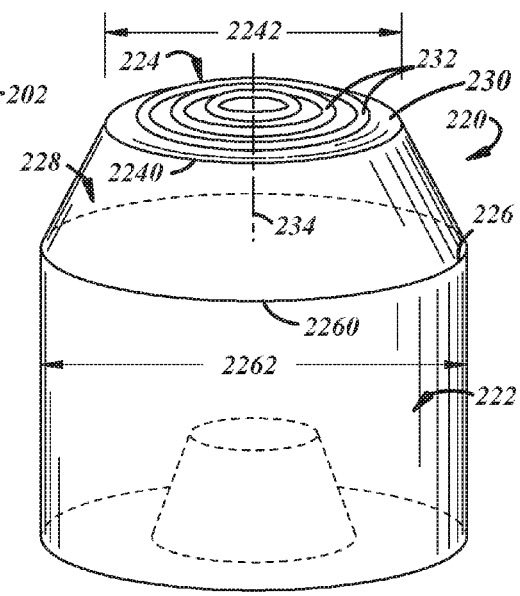
FIG. 11 is a general perspective view of a welding electrode that includes a second weld face geometry, which is different from the first weld face geometry, according to one embodiment of the disclosure.

A welding electrode 220 (also referred to as the "second welding electrode 220") that includes the second weld face geometry and is dressable within the second cutting socket 34 by the second shearing surface(s) 70 of the one or more cutting flutes 58 is shown in FIG. 11. The second electrode 220 includes an electrode body 222 and a weld face 224. The electrode body 222 is preferably cylindrical in shape and includes a front end 226 having a circumference 2260. A diameter 2262 of the body 222 taken at its front end circumference 2260 preferably lies within the range of 12 mm to 22 mm or, more narrowly, within the range of 16 mm to 20 mm. The weld face 224 is disposed on the front end 226 of the body 222 and has a circumference 2240 that is coincident with the circumference 2260 of the front end 226 of the body 222 (a "full face electrode") or is upwardly displaced from the circumference 2260 of the front end 226, to a distance between 2 mm and 10 mm, by a transition nose 228 of frustoconical or truncated spherical shape. If the transition nose 228 is frustoconical, the angle of truncation is preferably between 30° and 60° from a horizontal plane of the weld face circumference 2040. If the transition nose 228 is spherical, the radius of curvature of the transition nose 228 preferably ranges between 6 mm and 12 mm.

The weld face 224 preferably has a diameter 2242 measured at its circumference 2240 that lies within the range of 8 mm to 20 mm or, more narrowly, within the range of 10 mm to 15 mm. In terms of its shape, the weld face 224 includes a base weld face surface 230 that is domed. As such, the base weld face surface 230 ascends upwardly and inwardly from the circumference 2240 of the weld face 224 to attain an upwardly curved convex shape. For example, in one particular embodiment, the base weld face surface 230 may be spherically domed in that it has with a spherical profile with a radius of curvature that preferably lies within the range of 15 mm to 300 mm or, more narrowly, within the range of 20 mm to 50 mm. Moreover, the weld face 224 includes a series of upstanding circular ridges 232 that project outwardly from the base weld face surface 230. These circular ridges 232 enable the second welding electrode 220 to establish good mechanical and electrical contact with an aluminum workpiece surface by stressing and fracturing the mechanically tough and electrically insulating refractory oxide layer(s) that typically coat the surface of an aluminum workpiece.

The series of upstanding circular ridges 232 are preferably centered about and surround an axis 234 of the weld face 224. The base weld face surface 230 from which the ridges 232 project may account for 50% or more, and preferably between 50% and 80%, of the surface area of the weld face 224. The remaining surface area is attributed to the series of upstanding circular ridges 232, which preferably includes anywhere from two to ten ridges 232, or more narrowly from three to five ridges 232. The several upstanding circular ridges 232 are radially spaced apart from each other on the base weld face surface 230 such that the upstanding ridges 232 become larger in diameter when moving from the innermost upstanding ridge 232a (FIG. 12) that immediately surrounds the axis 234 of the weld face 224 to the outermost upstanding ridge 232b (FIG. 12) that is most proximate to the circumference 2240 of the weld face 224 and, thus, furthest from the axis 234 of the weld face 224.

Figure 12:
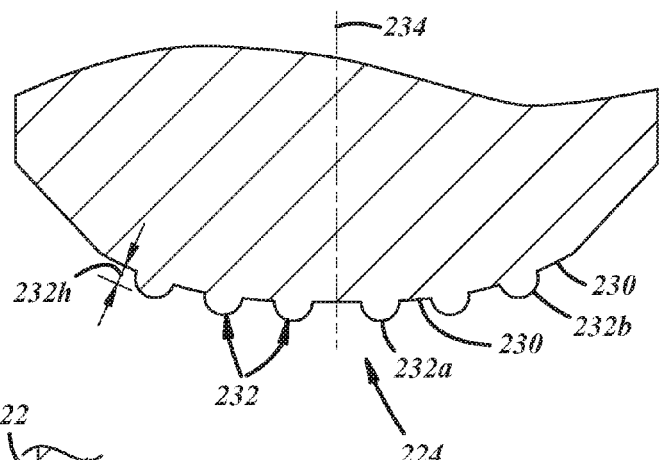
FIG. 12 is a magnified cross-sectional view of the weld face of the welding electrode shown in FIG. 11.
Figure 13:
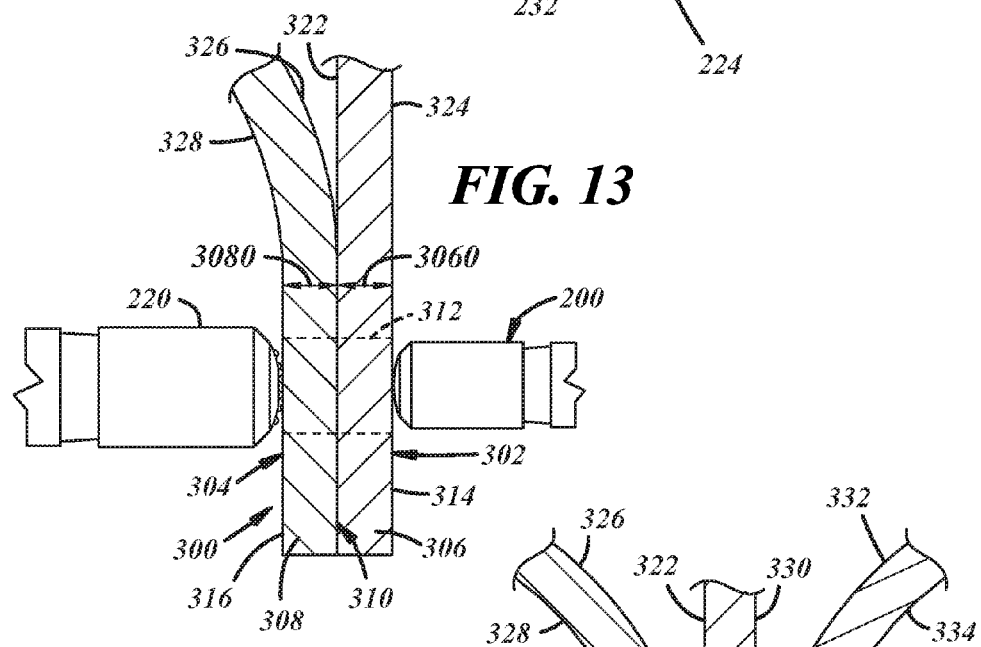
FIG. 13 is a general cross-sectional view of a workpiece stack-up, which includes a steel workpiece and an adjacent aluminum workpiece assembled in overlapping fashion, situated between a first welding electrode and a second welding electrode in which the first and second welding electrodes have different weld face geometries.

The size and shape of the upstanding circular ridges 232 are subject to some variability without sacrificing their dressability. In one embodiment, as shown best in FIG. 11, each of the upstanding circular ridges 232 has a closed circumference, meaning the circumference of the ridge 232 is continuously curved and thus not interrupted by significant separations, and is additionally defined by a cross-sectional profile that lacks sharp corners while having a curved (as shown) or flat top surface. Moreover, as shown in FIG. 12, each of the circular ridges 232 also has a ridge height 232h—taken at the midpoint of the ridge 232—that extends upwards from the base weld face surface 230 when viewed in cross-section. The ridge height 232h of each ridge 232 preferably ranges from 20 µm to 500 µm or, more narrowly, from 50 µm to 300 µm. And the spacing of the ridges 232 on the base weld face surface 230 as measured by the distance between the midpoints of two adjacent ridges 232 preferably ranges from 50 µm to 1800 µm or, more narrowly, from 80 µm to 1500 µm. Each of the circular ridges 232 is preferably semicircular, truncated semicircular, or triangular in cross-section.

The geometry of the weld face 224—in particular the domed base weld face surface 230 with the upstanding circular ridges 232 and the prescribed diameter 2242 of the weld face 224—may be cut and restored by receiving the degraded weld face 224 in the second cutting socket 34 of the cutting tool 10 and then rotating the tool 10 about the axis 234 of the weld face 224. In doing so, the upstanding circular ridges 232 on the weld face 224 are registered in the intruding grooves 96 that extend at least part of the way across the second shearing surface(s) 70 of the one or more cutting flutes 58, and the rotation of the cutting tool 10 shears off weld face material to expose fresh weld face material and to restore the second weld face geometry. The first and second weld face geometries of the first and second welding electrodes 200, 220 may be restored simultaneously by rotating the cutting tool 10 while both the first weld face 204 and the second weld face 224 are received in the first and second cutting sockets 32, 34, respectively.

Like the first spot welding electrode 200, the second welding electrode 220 may be constructed from any electrically and thermally conductive material suitable for spot welding applications that may experience degradation during welding. For example, the second welding electrode 220 may be constructed from a copper alloy having an electrical conductivity of at least 80% IACS, or more preferably at least 90% IACS, and a thermal conductivity of at least 300 W/mK, or more preferably at least 350 W/mK. Like before, one specific example of a copper alloy that may be used for the second welding electrode 220 is a copper-zirconium alloy (CuZr) that contains about 0.10 wt % to about 0.20 wt % zirconium and the balance copper. Copper alloys that meet this constituent composition and are designated C15000 are preferred. Other copper alloy compositions, as well as other metal compositions not explicitly recited here, that possess suitable mechanical properties as well as electrical and thermal conductivity properties may also be employed, including, for example, a C18200 copper-chromium (CuCr) alloy, a C18150 copper-chromium-zirconium (CuCrZr) alloy, or a refractory-based metal composite such as a tungsten-copper metal composite.

It should be appreciated that other cutting flute designs that are constructed to dress the asymmetric first and second weld faces geometries are of course possible and may be used as an alternative to the cutting flutes 58a, 58b, 58c, 58d—with their opposed first and second shearing surfaces 68a, 68b, 68c, 68d, 70a, 70b, 70c, 70d—shown in the Figures and described above. The cutting member 14 may, for example, include only one cutting flute 58 with a first shearing surface 68 and a second shearing surface 70. The axially spaced apart first and second shearing surfaces 68, 70 may include the lower end portions 72, 86 described above. In another example, the cutting member 14 may include two opposed cutting flutes 58, each of which has a first shearing surface 68 and a second shearing surface 70. The first shearing surfaces 68 and the second shearing surfaces 70 of the opposed cutting flutes 58 may be constructed in the same way as surfaces 68a, 68c and surfaces 70b, 70d, respectively, as described above.

Figure 14:
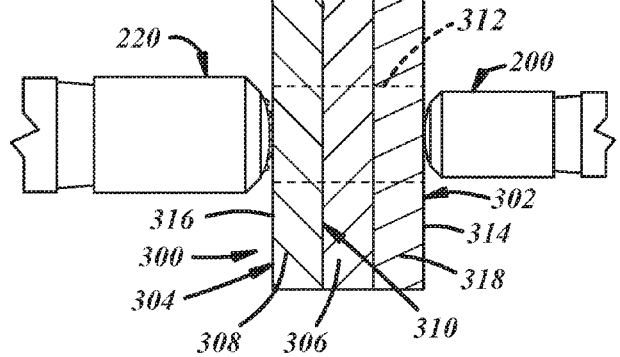
FIG. 14 is a general cross-sectional view of a workpiece stack-up, which includes a steel workpiece and an adjacent aluminum workpiece assembled in overlapping fashion, situated between a first welding electrode and a second welding electrode in which the first and second welding electrodes have different weld face geometries, although here the workpiece stack-up includes an additional steel workpiece (i.e., two steel workpieces and one aluminum workpiece) according to one embodiment of the disclosure.
Figure 15:
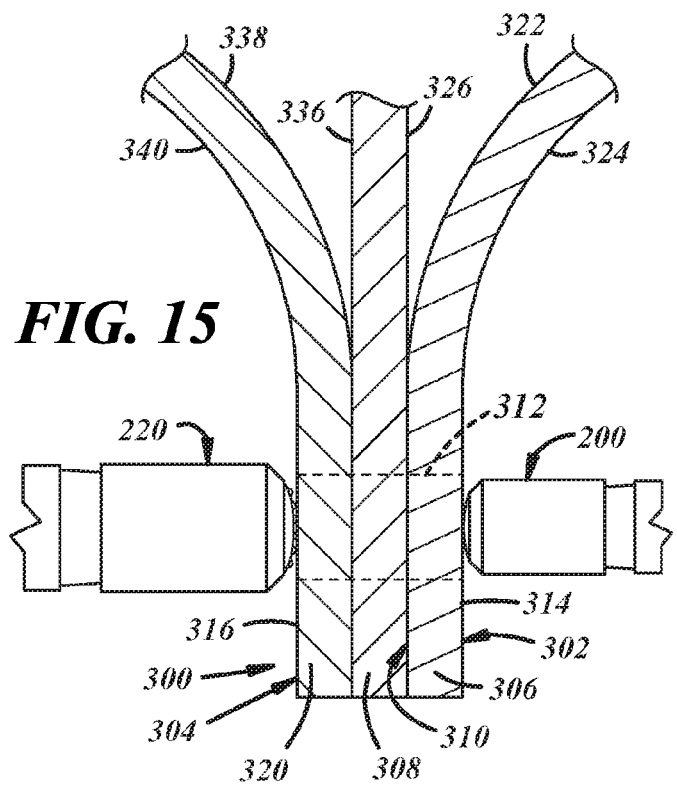
FIG. 15 is a general cross-sectional view of a workpiece stack-up, which includes a steel workpiece and an adjacent aluminum workpiece assembled in overlapping fashion, situated between a first welding electrode and a second welding electrode in which the first and second welding electrodes have different weld face geometries, although here the workpiece stack-up includes an additional aluminum workpiece (i.e., two aluminum workpieces and one steel workpiece) according to one embodiment of the disclosure.

The cutting tool 10 may be used to dress a pair of welding electrodes, as needed, that are engaged in resistance spot welding a workpiece stack-up 300 that includes dissimilar workpieces, as shown in FIGS. 13-18. The workpiece stack-up 300 has a first side 302 and a second side 304 and includes at least a steel workpiece 306 and an aluminum workpiece 308 that overlap with and lie adjacent to one another to establish a faying interface 310 that extends through a weld site 312. The first side 302 of the workpiece stack-up 300 is provided by a steel workpiece surface 314 and the second side 304 is provided by an aluminum workpiece surface 316. The workpiece stack-up 300 may thus be a "2T" stack-up that includes only the adjacent pair of steel and aluminum workpieces 306, 308, or it may be a "3T" stack-up that includes the adjacent steel and aluminum workpieces 306, 308 plus an additional steel workpiece 318 (steel-steel-aluminum as shown in FIG. 14) or an additional aluminum workpiece 320 (steel-aluminum-aluminum as shown in FIG. 15) so long as the two workpieces of the same base metal composition are disposed next to each other. In other embodiments, the workpiece stack-up 300 may even be a "4T" stack-up such as steel-steel-steel-aluminum, steel-steel-aluminum-aluminum, or steel-aluminum-aluminum-aluminum).

The steel workpiece 306 includes a steel substrate of any of a wide variety of strengths and grades that is either coated or uncoated (i.e., bare). The coated or uncoated steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 306 includes press-hardened steel (PHS). If coated, the steel substrate preferably includes a surface layer of zinc (e.g., a hot-dip galvanized or electrogalvanized), zinc-iron (galvanneal), a zinc-nickel alloy, nickel, aluminum, or an aluminum-silicon alloy. The term "steel workpiece" as used herein thus encompasses a wide variety of steel substrates, whether coated or uncoated, of different grades and strengths, and further includes those that have undergone pre-welding treatments like annealing, quenching, and/or tempering such as in the production of press-hardened steel. Taking into account the thickness of the steel substrate and any surface coating that may be present, the steel workpiece 306 has a thickness 3060 that ranges from 0.3 mm and 6.0 mm, or more narrowly from 0.6 mm to 2.5 mm, at least at the weld site 312.

The aluminum workpiece 308 includes an aluminum substrate that is either coated or uncoated (i.e., bare). The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, or an aluminum-zinc alloy. If coated, the aluminum substrate preferably includes a surface layer of its native refractory oxide layer(s), or, alternatively, it may include a surface layer of zinc, tin, or a metal oxide conversion coating comprised of oxides of titanium, zirconium, chromium, or silicon, as described in US2014/0360986. Taking into account the thickness of the aluminum substrate and any surface coating that may be present, the aluminum workpiece 308 has a thickness 3080 that ranges from 0.3 mm to about 6.0 mm, or more narrowly from 0.5 mm to 3.0 mm, at least at the weld site 312.

The aluminum substrate of the aluminum workpiece 308 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, or 7xx.x series aluminum alloy casting. Some more specific kinds of aluminum alloys that may constitute the aluminum substrate include, but are not limited to, AA5182 and AA5754 aluminum-magnesium alloy, AA6011 and AA6022 aluminum-magnesium-silicon alloy, AA7003 and AA7055 aluminum-zinc alloy, and Al-10Si-Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloy substrates, whether coated or uncoated, in different spot-weldable forms including wrought sheet layers, extrusions, forgings, etc., as well as castings, and further includes those that have undergone pre-welding treatments such as annealing, strain hardening, and solution heat treating.

The steel workpiece surface 314 and the aluminum workpiece surface 316 that provide the first and second sides 302, 304 of the workpiece stack-up 300 may be presented by the adjacent and overlapping steel and aluminum workpieces 306, 308. For example, when the two workpieces 306, 308 are stacked-up for spot welding in the context of the "2T" embodiment shown in FIG. 13, the steel workpiece 306 includes a faying surface 322 and an exterior outer surface 324 and, likewise, the aluminum workpiece 308 includes a faying surface 326 and an exterior outer surface 328. The faying surfaces 322, 326 of the two workpieces 306, 308 overlap and contact one another to establish the faying interface 310 that extends through the weld site 312. The exterior outer surfaces 324, 328 of the steel and aluminum workpieces 306, 308, on the other hand, face away from one another in opposite directions at the weld site 312 and constitute the steel and aluminum workpiece surfaces 314, 316, respectively, of the workpiece stack-up 300.

The term "faying interface 310" is used broadly in the present disclosure and is intended to encompass instances of direct and indirect contact between the faying surfaces 322, 326 of the adjacent steel and aluminum workpieces 306, 308. The faying surfaces 322, 326 are in direct contact with each other when they physically abut and are not separated by a discrete intervening material layer. The faying surfaces 322, 326 are in indirect contact with each other when they are separated by a discrete intervening material layer—and thus do not experience the type of interfacial physical abutment found in direct contact—yet are in close enough proximity to each other that resistance spot welding can still be practiced. Indirect contact between the faying surfaces 322, 326 of the steel and aluminum workpieces 306, 308 typically results when an optional intermediate material layer (not shown) is applied between the faying surfaces 322, 326 before the workpieces 306, 308 are superimposed against each other during formation of the workpiece stack-up 300.

An intermediate material layer that may be present between the faying surfaces 322, 326 of the adjacent steel and aluminum workpieces 306, 308 is an uncured yet heat-curable structural adhesive. Such an intermediate material typically has a thickness of 0.1 mm to 2.0 mm, which permits spot welding through the intermediate layer without much difficulty. A structural adhesive may be disposed between the faying surfaces 322, 326 of the steel and aluminum workpieces 306, 308 so that, following spot welding, the workpiece stack-up 300 can be heated in an ELPO-bake oven or other apparatus to cure the adhesive and provide additional bonding between the workpieces 306, 308. A specific example of a suitable heat-curable structural adhesive is a heat-curable epoxy that may include filler particles, such as silica particles, to modify the viscosity or other mechanical properties of the adhesive when cured. A variety of heat-curable epoxies are commercially available including DOW Betamate 1486, Henkel 5089, and Uniseal 2343. Other types of materials may certainly constitute the intermediate material layer in lieu of a heat-curable structural adhesive.

Of course, as shown in FIGS. 14-15, the workpiece stack-up 300 is not limited to the inclusion of only the steel workpiece 306 and the adjacent aluminum workpiece 308. The workpiece stack-up 300 may also include the additional steel workpiece 318 or the additional aluminum workpiece 320—in addition to the adjacent steel and aluminum alloy workpieces 306, 308—so long as the additional workpiece is disposed adjacent to the workpiece 306, 308 of the same base metal composition; that is, the additional steel workpiece 318 (if present) is disposed adjacent to the other steel workpiece 306 and the additional aluminum workpiece 320 (if present) is disposed adjacent to the other aluminum workpiece 308. As for the characteristics of the additional workpiece, the descriptions of the steel workpiece 306 and the aluminum workpiece 308 provided above are applicable to the additional steel or the additional aluminum workpiece that may be included in the workpiece stack-up 300. It should be noted, though, that while the same general descriptions apply, there is no requirement that the two steel workpieces or the two aluminum workpieces of a 3T stack-up be identical in terms of composition, thickness, or form (e.g., wrought or cast).

As shown in FIG. 14, for example, the workpiece stack-up 300 may include the adjacent steel and aluminum workpieces 306, 308 described above along with the additional steel workpiece 318 that overlaps and is disposed adjacent to the steel workpiece 306. When the additional steel workpiece 318 is so positioned, the exterior outer surface 328 of the aluminum workpiece 308 constitutes the aluminum workpiece surface 316 that provides the second side 304 of the workpiece stack-up 300, as before, while the steel workpiece 306 that lies adjacent to the aluminum workpiece 308 now includes a pair of opposed faying surfaces 322, 330. The faying surface 322 of the steel workpiece 306 that confronts and contacts (directly or indirectly) the adjacent faying surface 326 of the aluminum workpiece 308 establishes the faying interface 310 between the two workpieces 306, 308 as previously described. The other faying surface 330 of the steel workpiece 306 confronts and makes overlapping contact (direct or indirect) with a faying surface 332 of the additional steel workpiece 318. As such, in this particular arrangement of lapped workpieces 308, 306, 318, an exterior outer surface 334 of the additional steel workpiece 318 now constitutes the steel workpiece surface 314 that provides the first side 302 of the workpiece stack-up 300.

In another example, as shown in FIG. 15, the workpiece stack-up 300 may include the adjacent steel and aluminum workpieces 306, 308 described above along with the additional aluminum workpiece 320 that overlaps and is disposed adjacent to the aluminum workpiece 308. When the additional aluminum workpiece 320 is so positioned, the exterior outer surface 324 of the steel workpiece 306 constitutes the steel workpiece surface 314 that provides the first side 302 of the workpiece stack-up 300, as before, while the aluminum workpiece 308 that lies adjacent to the steel workpiece 306 now includes a pair of opposed faying surfaces 326, 336. The faying surface 326 of the aluminum workpiece 308 that confronts and contacts (directly or indirectly) the adjacent faying surface 322 of the steel workpiece 306 establishes the faying interface 310 between the two workpieces 306, 308 as previously described. The other faying surface 336 of the aluminum workpiece 308 confronts and makes overlapping contact (direct or indirect) with a faying surface 338 of the additional aluminum workpiece 320. As such, in this particular arrangement of lapped workpieces 306, 308, 320, an exterior outer surface 340 of the additional aluminum workpiece 320 now constitutes the aluminum workpiece surface 316 that provides the second side 304 of the workpiece stack-up 310.

Figure 16:
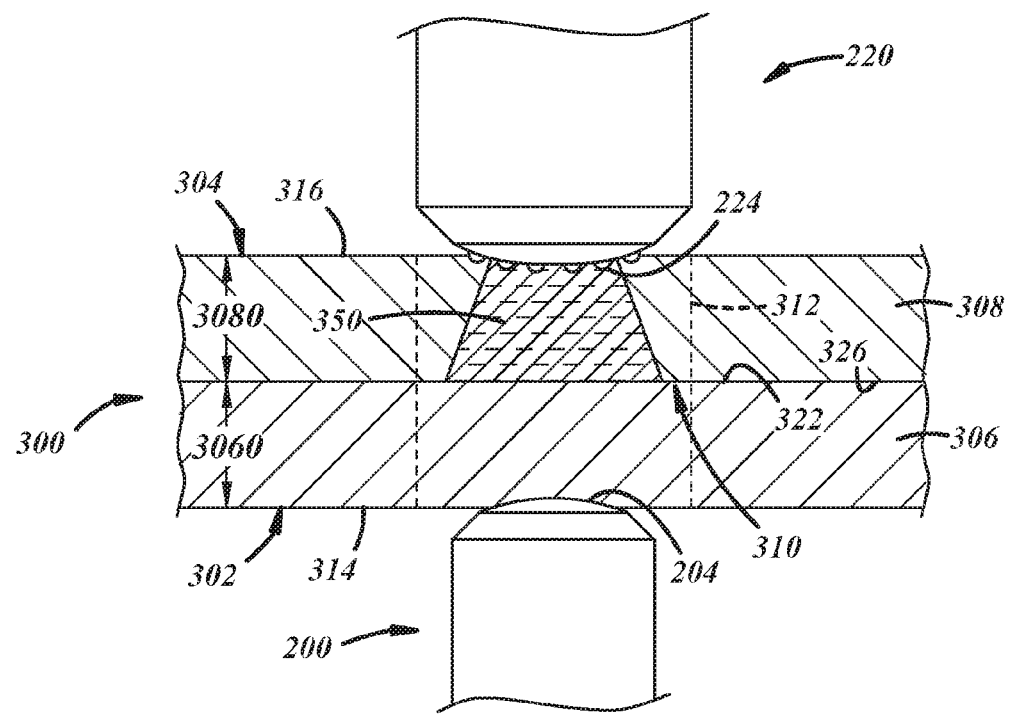
FIG. 16 is a general cross-sectional view of the workpiece stack-up and welding electrodes shown in FIG. 13 during passage of electrical current between the welding electrodes and through the stack-up, and wherein the passage of electrical current has caused melting of the aluminum workpiece that lies adjacent to the steel workpiece and the creation of a molten aluminum weld pool within the aluminum workpiece.
Figure 17:
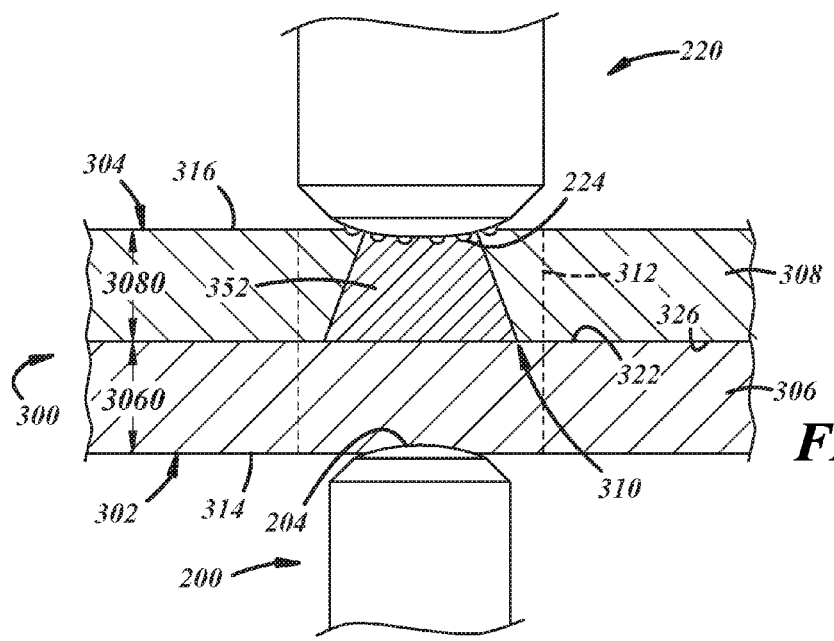
FIG. 17 is a general cross-sectional view of the workpiece stack-up and welding electrodes shown in FIG. 13 after passage of the electrical current between the welding electrodes and through the stack-up has ceased, and wherein the molten aluminum weld pool has solidified into a weld joint that weld bonds the adjacent aluminum and steel workpieces together.

Turning now to FIGS. 16-17, the first welding electrode 200 and the second welding electrode 220 described above may be employed to resistance spot weld the workpiece stack-up 300. The weld face 204 of the first welding electrode 200 has the first geometry (dressable by the first cutting socket 32 of the cutting tool 10) and the second weld face 224 of the second welding electrode 220 has the second geometry (dressable by the second cutting socket 34 of the cutting tool 10). The welding electrodes 200, 220 are carried on a weld gun (not shown) of any suitable type, including a C-type or an X-type gun, and are electrically coupled to a power supply capable of delivering electrical current—preferably a direct electrical current in the range of 5 kA to 50 kA—between the welding electrodes 200, 220 and through the workpiece stack-up 300 according to a programmed weld schedule. The weld gun may also be fitted with coolant lines and associated control equipment in order to deliver a coolant fluid, such as water, to each of the welding electrodes 200, 220 during spot welding operations.

The resistance spot welding method begins by positioning the first and second welding electrodes 200, 220 relative to the workpiece stack-up 300 such that the first weld face 204 confronts the steel workpiece surface 314 and the second weld face 224 confronts the aluminum workpiece surface 316, as shown in FIG. 16. The first weld face 204 and the second weld face 224 are then pressed against their respective steel and aluminum workpiece surfaces 314, 316 in facial alignment with one another under an imposed clamping force at the weld site 312. The imposed clamping force preferably ranges from 400 lb to 2000 lb or, more narrowly from 600 lb to 1300 lb. While only the steel and aluminum workpieces 306, 308 that overlap and lie adjacent to one another, thereby establishing the faying interface 310, are depicted in this Figure, the following discussion of the resistance spot welding method applies equally to instances in which the workpiece stack-up 300 includes the additional steel workpiece 318 or the additional aluminum workpiece 320 (FIGS. 14-15) even though those additional workpieces 318, 320 are omitted from the Figures for the sake of clarity.

After the first weld face 204 and the second weld face 224 are pressed against the steel and aluminum workpieces surfaces 314, 316 of the workpiece stack-up 300, respectively, electrical current is passed between the welding electrodes 200, 220 by way of their facially aligned weld faces 204, 224. The electrical current exchanged between the welding electrodes 200, 220 passes through the workpiece stack-up 300 and across the faying interface 310 established between the adjacent steel and aluminum workpieces 306, 308. Resistance to the flow of electrical current, which is preferably a DC electrical current having a current level that ranges from 5 kA to 50 kA, melts the aluminum workpiece 308 and creates a molten aluminum weld pool 350 within the aluminum workpiece 308. The molten aluminum weld pool 350 wets the faying surface 322 of the steel workpiece 308 and penetrates a distance into the aluminum workpiece 308 that ranges from 20% to 100% of the thickness 3080 of the aluminum workpiece 308 at the weld site 312.

Upon cessation of electrical current flow, the molten aluminum weld pool 350 solidifies into a weld joint 352 that weld bonds the steel and aluminum workpieces 306, 308 together at the weld site 312, as shown in FIG. 17, without consuming the faying interface 310 between the workpieces 306, 308. The weld joint 352 includes resolidified material of the aluminum workpiece 308, and may also include one or more reaction layers of Fe—Al intermetallic compounds adjacent to the faying surface 322 of the steel workpiece 306. The one or more Fe—Al intermetallic layers can include $FeAl_3$ compounds, $Fe_2Al_5$ compounds, and possibly other intermetallic compounds, and typically have a combined total thickness of 1 μm to 5 μm. The weld joint 352 extends into the aluminum workpiece 308 to a distance that often ranges from 20% to 100% (100% being all the way through the aluminum workpiece 308) of the thickness 3080 of the aluminum workpiece 308 at the weld site 312, just like the pre-existing molten aluminum weld pool 350.

After passage of the electrical current between the welding electrodes 200, 220 has ceased and the clamping force imposed by the electrodes 200, 220 is no longer needed, the welding electrodes 200, 220 are retracted from their respective steel and aluminum workpieces surfaces 314, 316. The resistance spot welding method is then repeated at other weld sites 312 on the same or a different workpiece stack-up 300. The continued use of the first and second welding electrodes 200, 220 in resistance spot welding operations eventually causes the first weld face 204 and the second weld face 224 to become degraded. Such degradation of the weld faces 204, 224 is generally unavoidable and, at some point, begins to interfere with the communication of the electrical current between the welding electrodes 200, 220 and through the workpiece stack-up 300. When current flow is interfered with as a result of appreciable weld face degradation, the formation of the weld joint 352 is disrupted, making it difficult to consistently attain good strength properties in the joint 352.

The combination of dissimilar materials in the workpiece stack-up 300 and the different weld face geometries of the first and second welding electrodes 200, 220 leads to different forms of degradation occurring at the first and second weld faces 204, 224. For instance, the first weld face 204 of the first welding electrode 200 may experience macro-deformation in the form of mushrooming due to the high temperatures experienced at the steel workpiece surface 314 and the clamping pressure imposed on the weld face 204, especially when the steel workpiece 306 includes a high strength steel such as DP, TRIP, or others. Additionally, the first weld face 204, if constructed from a copper alloy, may react with zinc on the steel workpiece 306, if present, to form a copper-zinc alloy layer on the weld face 204 that accelerates macro-deformation. The second weld face 224 of the second welding electrode 220, on the other hand, if constructed from a copper alloy, may experience a metallurgical reaction between copper and aluminum that forms a copper-aluminum reaction product. This copper-aluminum reaction product can spall and pit the weld face 224. Additionally, the upstanding circular ridges 232 may become deformed or flattened over time, which compromises the ability of the weld face 224 to communicate electrical current into or out of the workpiece stack-up 300.

The first and second weld faces 204, 224 may be periodically dressed by the cutting tool 10 whenever desired to counteract weld face degradation and thus extend the useful operational lifetime of the first and second welding electrodes 200, 220. Specifically, the first and second welding electrodes 200, 220 may be dressed after forming anywhere from 10 to 100 weld joints 352. That is, the first and second welding electrodes 200, 220 may be used to form a first set of weld joints 352, which ranges from 10 to 100, followed by dressing with the cutting tool 10. After dressing, the first and second welding electrodes 200, 220 may be used to form a second set of weld joints 352, which again ranges from 10 to 100, followed by another dressing with the cutting tool 10. For each welding electrode 200, 220, this pattern of welding and dressing may continue until the cumulative consumption of weld face material resulting from the dressing operations renders the electrodes 200, 220 unfit for continued use. Since each dressing operation with the cutting tool 10 removes a depth of material ranging from 10 μm to 500 μm, and more preferably 50 μm to 200 μm, each of the welding electrodes 200, 220 can usually withstand anywhere from 10 to 500 dressing operations before having to be replaced with a new electrode of the same weld face geometry.

Figure 18:
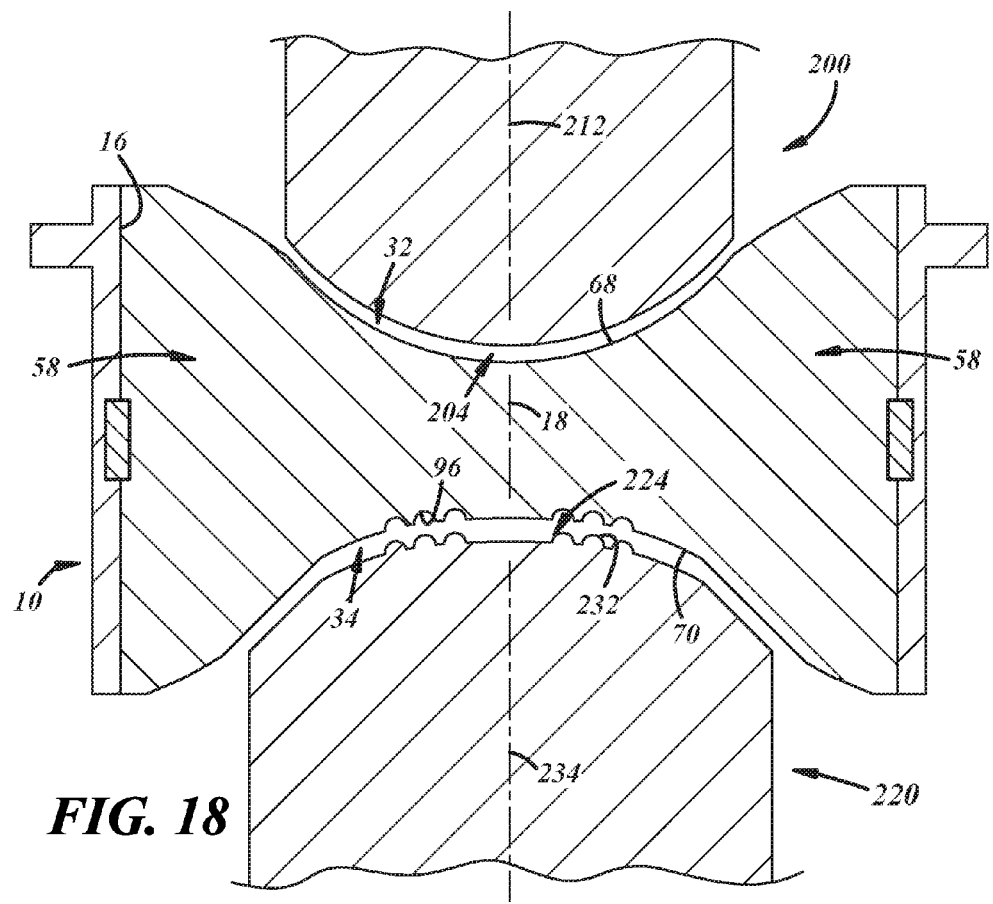
FIG. 18 depicts dressing of at least the weld faces of the first and second welding electrodes in which the first welding electrode is received in the first cutting socket of the cutting tool and the second welding electrode is received in the second cutting socket.

Using the cutting tool 10 to dress the first and second weld faces 204, 224 can be performed without removing the first and second welding electrodes 200, 220 from the weld gun. The dressing operation involves mounting the cutting tool 10 into a rotatable holder. The first and second welding electrodes 200, 220 are then converged simultaneously along the central axis 18 of the through hole 16 of the cutting tool 10 such that the first weld face 204 is received in the first cutting socket 32 and the second weld face 224 is received in the second cutting socket 34, as illustrated in FIG. 18. Such receipt of the weld faces 204, 224 brings them into contact with the first and second shearing surface(s) 68, 70, respectively, of the one or more cutting flutes 58 of the cutting member 14. At this time, the upstanding circular ridges 232 on the second weld face 224 are registered with and received in the matching intruding grooves 96 defined in the second shearing surface(s) 70 of the second cutting socket 34. When the first and second weld faces 204, 224 are so received, the axis 212 of the first weld face 204 and the axis 234 of the second weld face 224 are coaxially aligned with the central axis 18 of the through hole 16 of the cutting tool 10.

The cutting tool 10 is rotated about the central axis 18 of the through hole 16 at a speed that typically ranges from 100 rpm to 1000 rpm or, more narrowly, from 200 rpm to 500 rpm, for a minimum of one to ten or, more narrowly, four to six full revolutions about the axes 212, 234 of the weld faces 204, 224. During such rotation, the leading edges 76, 90 of the shearing surface(s) 68, 70 of the one or more cutting flutes 58 are likewise rotated about the axis 212, 234 of their respective weld faces 204, 224 while remaining in contact with the weld faces 204, 224. Such rotational movement of the leading edges 76, 90 around the weld faces 204, 224 cuts the first and second weld faces 204, 224 and their associated transition noses 208, 228 to expose fresh weld face material and restore the first and second weld face geometries. Once the first and second weld faces 204, 224 have been adequately dressed, the welding electrodes 200, 220 are retracted from the first and second cutting sockets 32, 34 and, because they are still carried by the weld gun, can be quickly returned to service.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A cutting tool capable of dressing a weld face of a first welding electrode so that the weld face of the first welding electrode has a first weld face geometry, and dressing a weld face of a second welding electrode so that the weld face of the second welding electrode has a second weld face geometry, the first weld face geometry and the second weld face geometry being asymmetric, and wherein the first weld face geometry consists of a domed base weld face surface and the second weld face geometry consists of a domed base weld face surface and a series of upstanding circular ridges that project outwardly from the domed base weld face surface of the second weld face geometry, the cutting tool comprising:

a body having a first end and a second end that are spaced apart along a central axis of the body, the first end of the body having a first opening and the second end of the body having a second opening; and a cutting member within the body, the cutting member having one or more cutting flutes, each of the one or more cutting flutes extending inwardly from an interior surface of the body and comprising a cutting blade that has first and second shearing surfaces that are axially spaced apart along the central axis of the body, the one or more cutting flutes establishing a first cutting socket and a second cutting socket, the first cutting socket being defined by the first shearing surfaces(s) of the cutting blade(s) and being accessible through the first opening of the body, and the second cutting socket being defined by the second shearing surface(s) of the cutting blade(s) and being accessible through the second opening of the body, the first cutting socket being constructed to cut the first weld face geometry into the weld face of the first welding electrode and the second cutting socket being constructed to cut the second weld face geometry into the weld face of the second welding electrode when the weld face of the first welding electrode is received in the first cutting socket and the weld face of the second welding electrode is received in the second cutting socket, and the cutting tool is rotated.

2. The cutting tool set forth in claim 1, wherein each of the one or more cutting flutes comprises an elongate foot, and wherein each elongate foot of the one or more cutting flutes supports the cutting blade of its respective cutting flute at the interior surface of the body.

3. The cutting tool set forth in claim 2, wherein the interior surface of the body has one or more retention channels that extend axially from the first end of the body to the second end of the body, each of the retention channels being defined by a depressed surface of the interior surface of the body, and wherein each elongate foot of the one or more cutting flutes is separately friction fit within one of the retention channels to fixedly retain the cutting member within the body.

4. The cutting tool set forth in claim 2, wherein each elongate foot of the one or more cutting flutes is integrally formed with the interior surface of the body to fixedly retain the cutting member within the body.

5. The cutting tool set forth in claim 1, wherein the domed base weld face surface of the first weld face geometry is a spherically domed base weld face surface that has a diameter between 3 mm and 16 mm and a radius of curvature between 8 mm and 400 mm.

6. The cutting tool set forth in claim 1, wherein the domed base weld face surface of the second weld face geometry is a spherically domed base weld face surface that has a diameter between 8 mm and 20 mm and a radius of curvature between 15 mm and 300 mm, and wherein the series of upstanding circular ridges of the second weld face geometry includes anywhere from two to ten upstanding circular ridges that surround a weld face axis and increase in diameter from an innermost upstanding circular ridge that immediately surrounds the weld face axis to an outermost upstanding circular ridge furthest from the weld face axis, the two to ten upstanding circular ridges being spaced apart on the spherically domed base weld face surface of the second weld face geometry by a distance of 50 µm to 1800 µm, and each of the two to ten upstanding circular ridges having a ridge height that ranges from 20 µm to 500 µm.

7. The cutting tool set forth in claim 1, wherein the one or more cutting flutes that each comprise a respective cutting blade having respective first and second shearing surfaces of the cutting member comprises a first cutting flute having a first cutting blade, a second cutting flute having a second cutting blade, a third cutting flute having a third cutting blade, and a fourth cutting flute having a fourth cutting blade, the first, second, third, and fourth cutting blades being circumferentially spaced from each other such that each of the first, second, third, and fourth cutting blades is oriented transverse to each of its two circumferentially adjacent cutting blades.

8. The cutting tool set forth in claim 7,
wherein an imaginary plane perpendicular to the central axis bisects the cutting member, and
wherein the first shearing surface of the first cutting blade and the first shearing surface of the third cutting blade are opposed from each other and separated circumferentially by the first shearing surface of the second cutting blade and the first shearing surface of the fourth cutting blade such that each of the first shearing surface of the second cutting blade and the first shearing surface of the fourth cutting blade is oriented transverse to the first shearing surface of the first cutting blade and the first shearing surface of the third cutting blade, each of the first shearing surface of the first cutting blade and the first shearing surface of the third cutting blade comprising, relative to the imaginary plane, a distal convex end portion and a proximal end portion, the proximal end portion of the first shearing surface of the first cutting blade extending radially inward from the distal convex end portion of the first shearing surface of the first cutting blade, and the proximal end portion of the first shearing surface of the third cutting blade extending radially inward from the distal convex end portion of the first shearing surface of the third cutting blade,
each of the proximal end portion of the first shearing surface of the first cutting blade and the proximal end portion of the first shearing surface of the third cutting blade having corresponding leading and trailing edges relative to rotation of the cutting tool about the central axis,
wherein the proximal end portion of the first shearing surface of the first cutting blade is inclined at a positive relief angle such that the leading edge of the proximal end portion of the first shearing surface of the first cutting blade is more distal to the imaginary plane than is the trailing edge of the proximal end portion of the first shearing surface of the first cutting blade, and wherein the proximal end portion of the first shearing surface of the third cutting blade is inclined at a positive relief angle such that the leading edge of the proximal end portion of the first shearing surface of the third cutting blade is more distal to the imaginary plane than is the trailing edge of the proximal end portion of the first shearing surface of the third cutting blade,
each of the proximal end portion of the first shearing surface of the first cutting blade and the proximal end portion of the first shearing surface of the third cutting blade being profiled to cut the first weld face geometry when the cutting tool is rotated, and
wherein the second shearing surface of the second cutting blade and the second shearing surface of the fourth cutting blade are opposed from each other and separated circumferentially by the second shearing surface of the first cutting blade and the second shearing surface of the third cutting blade such that each of the second shearing surface of the first cutting blade and the second shearing surface of the third cutting blade is oriented transverse to the second shearing surface of the second cutting blade and the second shearing surface of the fourth cutting blade, each of the second shearing surface of the second cutting blade and the second shearing surface of the fourth cutting blade comprising, relative to the imaginary plane, a distal convex end portion and a proximal end portion, the proximal end portion of the second shearing surface of the second cutting blade extending radially inward from the distal convex end portion of the second shearing surface of the second cutting blade, and the proximal end portion of the second shearing surface of the fourth cutting blade extending radially inward from the distal convex end portion of the second shearing surface of the fourth cutting blade, each of the proximal end portion of the second shearing surface of the second cutting blade and the proximal end portion of the second shearing surface of the fourth cutting blade having corresponding leading and trailing edges relative to rotation of the cutting tool about the central axis, wherein the proximal end portion of the second shearing surface of the second cutting blade is inclined at a positive relief angle such that the leading edge of the proximal end portion of the second shearing surface of the second cutting blade is more distal to the imaginary plane than is the trailing edge of the proximal end portion of the second shearing surface of the second cutting blade, and wherein the proximal end portion of the second shearing surface of the fourth cutting blade is inclined at a positive relief angle such that the leading edge of the proximal end portion of the second shearing surface of the fourth cutting blade is more distal to the imaginary plane than is the trailing edge of the proximal end portion of the second shearing surface of the fourth cutting blade and each of the proximal end portion of the second shearing surface of the second cutting blade and the proximal end portion of the second shearing surface of the fourth cutting blade being profiled to cut the second weld face geometry when the cutting tool is rotated.

9. The cutting tool set forth in claim 8, wherein the proximal end portion of the second shearing surface of the second cutting blade defines a plurality of intruding grooves that extend from the leading edge of the proximal end portion of the second shearing surface of the second cutting blade at least part of the way to the trailing edge of the proximal end portion of the second shearing surface of the second cutting blade, and wherein the proximal end portion of the second shearing surface of the fourth cutting blade defines a plurality of intruding grooves that extend from the leading edge of the proximal end portion of the second shearing surface of the fourth cutting blade at least part of the way to the trailing edge of the proximal end portion of the second shearing surface of the fourth cutting blade.

10. The cutting tool set forth in claim 7, wherein each of the distal convex end portion of the first shearing surface of the first cutting blade and the distal convex end portion of the first shearing surface of the third cutting blade has corresponding leading and trailing edges relative to rotation of the cutting tool about the central axis, wherein the distal convex end portion of each of the first shearing surface of the first cutting blade and the first shearing surface of the third cutting blade is inclined relative to the imaginary plane from the corresponding leading edge to the corresponding trailing edge, and wherein each of the distal convex end portion of the second shearing surface of the second cutting blade and the distal convex end portion of the second shearing surface of the fourth cutting blade has corresponding leading and trailing edges relative to rotation of the cutting tool about the central axis, and wherein the distal convex end portion of each of the second shearing surface of the second cutting blade and the second shearing surface of the fourth cutting blade is inclined relative to the imaginary plane from the corresponding leading edge to the corresponding trailing edge.

11. A cutting tool capable of dressing a weld face of a first welding electrode so that the weld face of the first welding electrode has a first weld face geometry, and dressing a weld face of a second welding electrode so that the weld face of the second welding electrode has a second weld face geometry, the first weld face geometry and the second weld face geometry being asymmetric, and wherein the first weld face geometry consists of a domed base weld face surface and the second weld face geometry consists of a domed base weld face surface and a series of upstanding circular ridges that project outwardly from the domed base weld face surface of the second weld face geometry, the cutting tool comprising:

a body that extends longitudinally along a central axis between a first end and a second end, and a cutting member within the body, the cutting member establishing a first cutting socket accessible through a first opening at the first end of the body and a second cutting socket accessible through a second opening at the second end of the body, the cutting member comprising a first cutting flute that includes a first cutting blade having first and second shearing surfaces that are axially spaced apart along the central axis of the body and that define, at least in part, the first and second cutting sockets, respectively, wherein an imaginary plane perpendicular to the central axis bisects the cutting member, wherein the first shearing surface of the first cutting blade comprises a distal convex end portion and a proximal end portion relative to the imaginary plane, the proximal end portion of the first shearing surface extending radially inward from the distal convex end portion of the first shearing surface and being profiled to cut the first weld face geometry, and wherein the second shearing surface of the first cutting blade comprises a distal convex end portion and a proximal end portion relative to the imaginary plane, the proximal end portion of the second shearing surface extending radially inward from the distal convex end portion of the second shearing surface and being profiled to cut the second weld face geometry.

12. The cutting tool set forth in claim 11, wherein the domed base weld face surface of the first weld face geometry is a spherically domed base weld face surface that has a diameter between 3 mm and 16 mm and a radius of curvature between 8 mm and 400 mm.

13. The cutting tool set forth in claim 11, wherein the domed base weld face surface of the second weld face geometry is a spherically domed base weld face surface that has a diameter between 8 mm and 20 mm and a radius of curvature between 15 mm and 300 mm, and wherein the series of upstanding circular ridges of the second weld face geometry includes anywhere from two to ten upstanding circular ridges that surround a weld face axis and increase in diameter from an innermost upstanding circular ridge that immediately surrounds the weld face axis to an outermost upstanding circular ridge furthest from the weld face axis, the two to ten upstanding circular ridges being spaced apart on the spherically domed base weld face surface of the second weld face geometry by a distance of 50 μm to 1800 μm, and each of the two to ten upstanding circular ridges having a ridge height that ranges from 20 μm to 500 μm.

14. The cutting tool set forth in claim 11, wherein the cutting member further comprises a second cutting flute having a second cutting blade, a third cutting flute having a third cutting blade, and a fourth cutting flute having a fourth cutting blade, the first, second, third, and fourth cutting blades being circumferentially spaced from each other such that each of the first, second, third, and fourth cutting blades is oriented transverse to each of its two circumferentially adjacent cutting blades, wherein each of the second cutting blade, the third cutting blade, and the fourth cutting blade includes corresponding first and second shearing surfaces that are axially spaced apart along the central axis of the body, wherein the first shearing surface of each of the second cutting blade, the third cutting blade, and the fourth cutting blade, respectively, comprises a respective distal convex end portion and a respective proximal end portion relative to the imaginary plane, the proximal end portion of each of the first shearing surface of the second cutting blade, the first shearing surface of the third cutting blade, and the first shearing surface of the fourth cutting blade extending radially inward from the distal convex end portion of the first shearing surface of the second cutting blade, the distal convex end portion of the first shearing surface of the third cutting blade, and the distal convex end portion of the first shearing surface of the fourth cutting blade, respectively, and the first shearing surface of the first cutting blade, the first shearing surface of the second cutting blade, the first shearing surface of the third cutting blade, and the first shearing surface of the fourth cutting blade defining the first cutting socket, and wherein the second shearing surface of each of the second cutting blade, the third cutting blade, and the fourth cutting blade comprises a respective distal convex end portion and a proximal end portion relative to the imaginary plane, the proximal end portion of each of the second shearing surface of the second cutting blade, the second shearing surface of the third cutting blade, and the second shearing surface of the fourth cutting blade extending radially inward from the distal convex end portion of the second shearing surface of the second cutting blade, the distal convex end portion of the second shearing surface of the third cutting blade, and the distal convex end portion of the second shearing surface of the fourth cutting blade, respectively, and the second shearing surface of the first cutting blade, the second shearing surface of the second cutting blade, the second shearing surface of the third cutting blade, and the second shearing surface of the fourth cutting blade defining the second cutting socket.

15. The cutting tool set forth in claim 14,
wherein the first shearing surface of the first cutting blade and the first shearing surface of the third cutting blade are opposed from each another and separated circumferentially by the first shearing surface of the second cutting blade and the first shearing surface of the fourth cutting blade such that each of the first shearing surface of the second cutting blade and the first shearing surface of the fourth cutting blade is oriented transverse to the first shearing surface of the first cutting blade and the first shearing surface of the third cutting blade,
each of the proximal end portion of the first shearing surface of the first cutting blade and the proximal end portion of the first shearing surface of the third cutting blade having corresponding leading and trailing edges relative to rotation of the cutting tool about the central axis;
the proximal end portion of each of the first shearing surface of the first cutting blade and the first shearing surface of the third cutting blade being inclined relative to the imaginary plane from the corresponding leading edge to the corresponding trailing edge,
the leading edge and the trailing edge of the proximal end portion of each of the first shearing surface of the first cutting blade and the first shearing surface of the third cutting blade being profiled so as to extend outwardly as the corresponding leading and trailing edges of the proximal end portion of each of the first shearing surface of the first cutting blade and the first shearing surface of the third cutting blade progress towards the distal convex end portion of the first shearing surface of the first cutting blade and the distal convex end portion of the first shearing surface of the third cutting blade, respectively, and wherein the second shearing surface of the second cutting blade and the second shearing surface of the fourth cutting blade are opposed from each other and separated circumferentially by the second shearing surface of the first cutting blade and the second shearing surface of the third cutting blade such that each of the second shearing surface of the first cutting blade and the second shearing surface of the third cutting blade is oriented transverse to the second shearing surface of the second cutting blade and the second shearing surface of the fourth cutting blade, each of the proximal end portion of the second shearing surface of the second cutting blade and the proximal end portion of the second shearing surface of the fourth cutting blade having corresponding leading and trailing edges relative to rotation of the cutting tool about the central axis;

the proximal end portion of each of the second shearing surface of the second cutting blade and the second shearing surface of the fourth cutting blade being inclined relative to the imaginary plane from the corresponding leading edge to the corresponding trailing edge, the leading edge and the trailing edge of the proximal end portion of each of the second shearing surface of the second cutting blade and the second shearing surface of the fourth cutting blade being profiled so as to extend outwardly as the corresponding leading and trailing edges of the proximal end portion of each of the second shearing surface of the second cutting blade and the second shearing surface of the fourth cutting blade progress towards the distal convex end portion of the second shearing surface of the second cutting blade and the distal convex end portion of the second shearing surface of the fourth cutting blade, respectively.

16. The cutting tool set forth in claim 11, wherein the body and the cutting member are integrally formed.

17. The cutting tool set forth in claim 11, wherein the body and the cutting member are discrete individual pieces that are secured together.

18. A cutting tool comprising:
a body that extends longitudinally along a central axis between a first end and a second end, and
a cutting member within the body, an imaginary plane perpendicular to the central axis bisecting the cutting member, the cutting member establishing a first cutting socket accessible through a first opening at the first end of the body and establishing a second cutting socket accessible through a second opening at the second end of the body, the cutting member comprising a first cutting flute, a second cutting flute, a third cutting flute, and a fourth cutting flute that are circumferentially spaced from each other within the body of the cutting tool, each of the first cutting flute, the second cutting flute, the third cutting flute, and the fourth cutting flute comprising:
a respective cutting blade; and
a respective elongate foot that supports the corresponding cutting blade at an interior surface of the body, wherein each of the cutting blades includes respective first and second shearing surfaces that are axially spaced apart along the central axis of the body and that define, at least in part, the first and second cutting sockets, respectively, wherein each of the first shearing surfaces comprises a respective distal convex end portion and a respective proximal end portion relative to the imaginary plane, each of the distal convex end portions of the first shearing surfaces extending radially inward from the respective elongate foot proximate the first end of the body and each of the proximal end portions of the first shearing surfaces extending radially inward from the respective distal convex end portion of the respective first shearing surface and away from a plane of the first opening of the body, and wherein each of the second shearing surfaces comprises a respective distal convex end portion and a respective proximal end portion relative to the imaginary plane, each of the distal convex end portions of the second shearing surfaces extending radially inward from the respective elongate foot proximate the second end of the body, and each of the proximal end portions of the second shearing surfaces extending radially inward from the respective distal convex end portion of the respective second shearing surface and away from a plane of the second opening of the body;

wherein the proximal end portion of the first shearing surface of the cutting blade of each of the first cutting flute, the second cutting flute, the third cutting flute, and the fourth cutting flute is profiled to achieve by cutting, upon rotation of the cutting tool about the central axis of the body, a first weld face geometry that consists of a domed base weld face surface;

wherein the proximal end portion of the second shearing surface of the cutting blade of each of the first cutting flute, the second cutting flute, the third cutting flute, and the fourth cutting flute is profiled to achieve by cutting, upon rotation of the cutting tool about the central axis of the body, a second weld face geometry that comprises a domed base weld face surface and a series of upstanding circular ridges that project outwardly from the domed base weld face surface of the second weld face geometry.

* * * * *